(12) United States Patent
Choi et al.

(10) Patent No.: US 12,466,951 B2
(45) Date of Patent: *Nov. 11, 2025

(54) POLYAMIDE RESIN FILM AND RESIN LAMINATE USING THE SAME

(71) Applicant: LG CHEM, LTD., Seoul (KR)

(72) Inventors: Il Hwan Choi, Daejeon (KR); Soonyong Park, Daejeon (KR); Young Ji Tae, Daejeon (KR); Youngseok Park, Daejeon (KR); Bi Oh Ryu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 848 days.

This patent is subject to a terminal disclaimer.

(21) Appl. No.: 16/972,389

(22) PCT Filed: Dec. 26, 2019

(86) PCT No.: PCT/KR2019/018450
§ 371 (c)(1),
(2) Date: Dec. 4, 2020

(87) PCT Pub. No.: WO2020/159086
PCT Pub. Date: Aug. 6, 2020

(65) Prior Publication Data
US 2021/0230425 A1 Jul. 29, 2021

(30) Foreign Application Priority Data

| | | |
|---|---|---|
| Feb. 1, 2019 | (KR) | 10-2019-0014020 |
| Feb. 1, 2019 | (KR) | 10-2019-0014021 |
| Jun. 5, 2019 | (KR) | 10-2019-0066620 |
| Dec. 23, 2019 | (KR) | 10-2019-0173086 |
| Dec. 24, 2019 | (KR) | 10-2019-0174355 |

(51) Int. Cl.
| | |
|---|---|
| *C08L 77/10* | (2006.01) |
| *B32B 27/08* | (2006.01) |
| *C08G 69/26* | (2006.01) |
| *C08G 69/42* | (2006.01) |
| *C08K 5/3475* | (2006.01) |
| *C08K 5/3492* | (2006.01) |
| *B32B 27/34* | (2006.01) |

(52) U.S. Cl.
CPC .............. *C08L 77/10* (2013.01); *B32B 27/08* (2013.01); *C08G 69/265* (2013.01); *C08G 69/42* (2013.01); *C08K 5/3475* (2013.01); *C08K 5/3492* (2013.01); *B32B 27/34* (2013.01); *B32B 2250/02* (2013.01); *B32B 2250/03* (2013.01); *B32B 2307/412* (2013.01); *B32B 2307/71* (2013.01); *B32B 2457/20* (2013.01); *C08L 2201/08* (2013.01); *C08L 2201/10* (2013.01); *C08L 2203/16* (2013.01); *C08L 2203/20* (2013.01)

(58) Field of Classification Search
CPC .. C08L 77/10; C08L 2201/08; C08L 2201/10; C08L 2203/16; C08L 2203/20; C08L 77/06; B32B 27/08; B32B 27/34; B32B 2250/02; B32B 2250/03; B32B 27/18; C08G 69/265; C08G 69/42; C08G 69/02; C08G 69/26; C08J 5/18; C08J 2377/06; C08J 2433/06; C08J 7/0427; C08J 7/046; C08K 5/3475; C08K 5/3492; C08K 5/00
USPC .......................................................... 528/347
See application file for complete search history.

(56) References Cited

U.S. PATENT DOCUMENTS

| | | | |
|---|---|---|---|
| 5,076,817 A | 12/1991 | Hayes | |
| 5,132,393 A | 7/1992 | Yoon et al. | |
| 7,214,742 B2 | 5/2007 | Bolle et al. | |
| 7,294,714 B2 | 11/2007 | Lazzari et al. | |
| 7,638,626 B2 | 12/2009 | Lazzari et al. | |
| 8,138,243 B2 | 3/2012 | Buehler et al. | |
| 8,648,982 B2 | 2/2014 | Yanai et al. | |
| 9,580,555 B2 | 2/2017 | Ju et al. | |
| 9,834,867 B2 | 12/2017 | Zaltieri et al. | |
| 9,961,548 B2 | 5/2018 | Bryksa et al. | |
| 9,963,548 B1 | 5/2018 | Sun et al. | |
| 10,689,513 B2 | 6/2020 | Ahn et al. | |
| RE48,141 E | 8/2020 | Ju et al. | |
| 11,351,763 B2 * | 6/2022 | Ryu | B32B 27/34 |
| 2004/0241111 A1 | 12/2004 | Lazzari et al. | |
| 2005/0171253 A1 | 8/2005 | Andrews et al. | |
| 2006/0106193 A1 * | 5/2006 | Moriyama | C08G 69/265 528/310 |
| 2007/0128442 A1 * | 6/2007 | Buehler | C08L 77/02 428/411.1 |

(Continued)

FOREIGN PATENT DOCUMENTS

| | | |
|---|---|---|
| CN | 1708537 A | 12/2005 |
| CN | 108794740 A | 11/2018 |

(Continued)

OTHER PUBLICATIONS

International Search Report in PCT/KR2019/018450 mailed Apr. 8, 2020, 4 pages.
Thomson Scientific, London, GB; AN 2005-438357, XP002803292, 2017, 3 pages.
Thomson Scientific, London, GB; AN 2006-235222, XP002803663, 2017, 3 pages.
Extended European Search Report issued for European Patent Application No. 19912432.2 on Jun. 23, 2021, 14 pages.

(Continued)

*Primary Examiner* — Gregory Listvoyb
(74) *Attorney, Agent, or Firm* — ROTHWELL, FIGG, ERNST & MANBECK, P.C.

(57) ABSTRACT

The present invention relates to a polyamide resin film having improved light resistance by minimizing color difference variation rate due to long-term ultraviolet irradiation, and a resin laminate using the same.

13 Claims, 2 Drawing Sheets

(56) References Cited

U.S. PATENT DOCUMENTS

| | | | |
|---|---|---|---|
| 2007/0249789 A1 | 10/2007 | Buehler et al. | |
| 2008/0032078 A1 | 2/2008 | Azzari et al. | |
| 2011/0178266 A1 | 7/2011 | Cho et al. | |
| 2012/0244330 A1* | 9/2012 | Sun | B29C 41/24 428/220 |
| 2012/0296037 A1 | 11/2012 | Cho et al. | |
| 2013/0011642 A1* | 1/2013 | Sun | C08L 77/10 264/319 |
| 2014/0083624 A1* | 3/2014 | Harris | C08G 69/32 156/701 |
| 2014/0084499 A1* | 3/2014 | Harris | C08G 69/265 524/612 |
| 2015/0097174 A1* | 4/2015 | Sun | C08G 69/32 428/335 |
| 2015/0266998 A1 | 9/2015 | Zaltieri et al. | |
| 2016/0032052 A1* | 2/2016 | Katayama | C08G 69/32 528/348 |
| 2016/0208096 A1* | 7/2016 | Sun | B32B 17/06 |
| 2017/0329062 A1 | 11/2017 | Nakajima et al. | |
| 2018/0002487 A1 | 1/2018 | Yang et al. | |
| 2018/0094135 A1 | 4/2018 | Sun et al. | |
| 2019/0077915 A1 | 3/2019 | Yun et al. | |
| 2019/0077917 A1 | 3/2019 | Jeong et al. | |
| 2020/0024401 A1 | 1/2020 | Ryu et al. | |
| 2020/0031962 A1 | 1/2020 | Kim et al. | |
| 2021/0189067 A1 | 6/2021 | Ryu et al. | |
| 2021/0222007 A1* | 7/2021 | Choi | C08K 5/00 |
| 2021/0230425 A1 | 7/2021 | Choi et al. | |
| 2022/0033653 A1 | 2/2022 | Choi et al. | |

FOREIGN PATENT DOCUMENTS

| | | |
|---|---|---|
| EP | 1564237 A1 | 8/2005 |
| EP | 3476592 A1 | 5/2019 |
| EP | 3392295 B1 | 1/2020 |
| JP | H04-226533 A | 8/1992 |
| JP | H09-239889 A | 9/1997 |
| JP | 2002-191928 A | 7/2002 |
| JP | 2005-146133 A | 6/2005 |
| JP | 2005-517787 A | 6/2005 |
| JP | 2006-077185 A | 3/2006 |
| JP | 2006-213812 A | 8/2006 |
| JP | 2006-316134 A | 11/2006 |
| JP | 2008-074991 A | 4/2008 |
| JP | 2011124174 A | 6/2011 |
| JP | 2013-079334 A | 5/2013 |
| JP | 2014-052604 A | 3/2014 |
| JP | 2015-120886 A | 7/2015 |
| JP | 2015-166179 A | 9/2015 |
| JP | 2016-145332 A | 8/2016 |
| JP | 7074280 B2 | 5/2022 |
| JP | 7088499 B2 | 6/2022 |
| KR | 10-2004-0096558 A | 11/2004 |
| KR | 10-2005-0067217 A | 6/2005 |
| KR | 10-2007-0104246 A | 10/2007 |
| KR | 10-2008-0101782 A | 11/2008 |
| KR | 10-2010-0035596 A | 4/2010 |
| KR | 10-2012-0129319 A | 11/2012 |
| KR | 10-2012-0130332 A | 11/2012 |
| KR | 10-2015-0067761 A | 6/2015 |
| KR | 10-2016-0085078 A | 7/2016 |
| KR | 10-2016-0089872 A | 7/2016 |
| KR | 10-2017-0089585 A | 8/2017 |
| KR | 10-2017-0126798 A | 11/2017 |
| KR | 10-2017-0136285 A | 12/2017 |
| KR | 10-2018-0039893 A | 4/2018 |
| KR | 10-2018-0062439 A | 6/2018 |
| KR | 10-2018-0090671 A | 8/2018 |
| KR | 10-2018-0098003 A | 9/2018 |
| KR | 10-2018-0131378 A | 12/2018 |
| KR | 10-2019-0028337 A | 3/2019 |
| KR | 10-2020-0050792 A | 5/2020 |
| KR | 10-2020-0051476 A | 5/2020 |
| KR | 10-2020-0067084 A | 6/2020 |
| TW | I602854 B | 10/2017 |
| TW | I606083 B | 11/2017 |
| WO | 2003-070819 A1 | 8/2003 |
| WO | 2004039863 A1 | 5/2004 |
| WO | 2012-146629 A1 | 11/2012 |
| WO | 2017-221783 A1 | 12/2017 |
| WO | 2018-155830 A1 | 8/2018 |

OTHER PUBLICATIONS

Extended European Search Report issued for European Patent Application No. 19913033.7 on Jul. 30, 2021, 17 pages.

* cited by examiner

[FIG. 1]
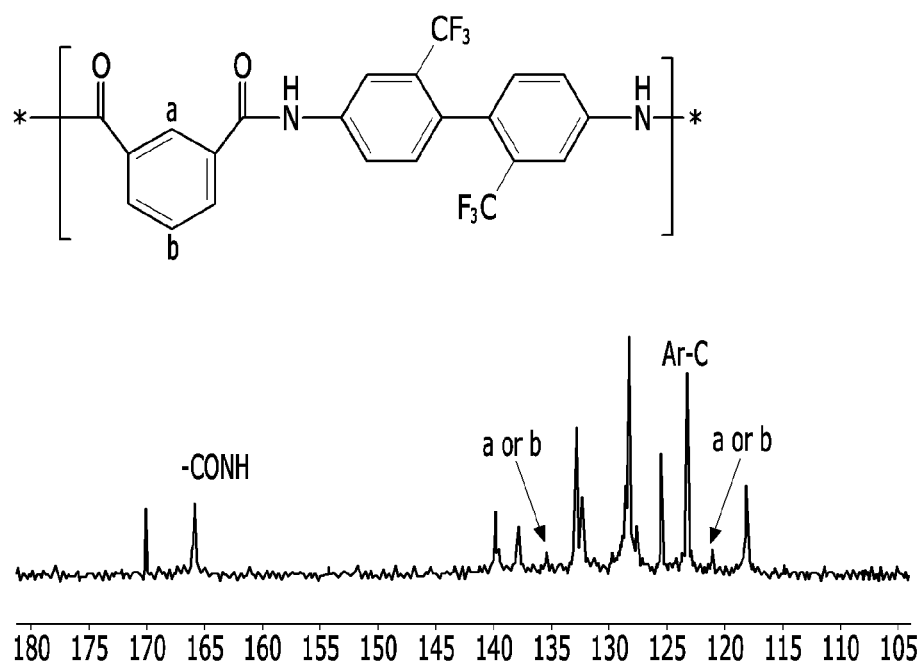

[FIG. 2]
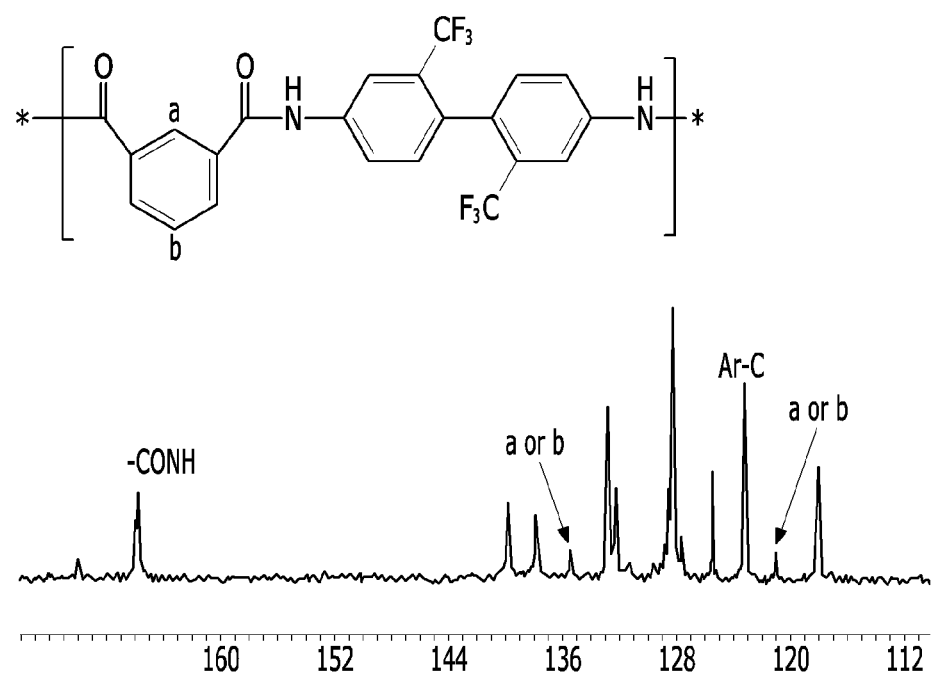

POLYAMIDE RESIN FILM AND RESIN LAMINATE USING THE SAME

TECHNICAL FIELD

Cross-Reference to Related Application(S)

This application is a 35 U.S.C. 371 National Phase Entry Application from PCT/KR2019/018450, filed on Dec. 26, 2019, designating the United States, which claims the benefit of priority from Korean Patent Application No. 10-2019-0014020 filed on Feb. 1, 2019; Korean Patent Application No. 10-2019-0014021 filed on Feb. 1, 2019; Korean Patent Application No. 10-2019-0066620 filed on Jun. 5, 2019; Korean Patent Application No. 10-2019-0173086 filed on Dec. 23, 2019; and Korean Patent Application No. 10-2019-0174355 filed on Dec. 24, 2019 in the Korean Intellectual Property Office, the disclosures of which are incorporated herein by reference in their entirety.

The present invention relates to a polyamide resin film that can secure at least an adequate level of mechanical properties and excellent transparency while improving light resistance against long-term ultraviolet irradiation.

BACKGROUND OF THE INVENTION

Aromatic polyimide resins are polymers mostly having an amorphous structure, and exhibits excellent heat resistance, chemical resistance, electrical properties, and dimensional stability due to their rigid chain structure. Thus, these polyimide resins are widely used as materials for electric/electronics.

However, the polyimide resins have many limitations in their use because they may appear dark brown in color due to charge transfer complex (CTC) formation of Pi-electrons present in the imide chain, and it is difficult to secure transparency. In the case of the polyimide film including the same, it has a drawback in that the surface is easily scratched and scratch resistance is very weak.

In order to solve the above limitation of the polyimide resin, studies on polyamide resins into which an amide group is introduced has been actively conducted. The amide structure induces intermolecular or intramolecular hydrogen bonds, resulting in improvement of scratch resistance by interactions such as hydrogen bonds.

However, due to the difference in solubility, reactivity (steric hindrance), and reaction rate of terephthaloyl chloride or isophthaloyl chloride used for the synthesis of the polyamide resin, amide repeating units derived from terephthaloyl chloride and amide repeating units derived from isophthaloyl chloride do not form a block, and are hardly polymerized ideally or alternatively.

Therefore, there is a limit that as the block of amide repeating units derived from the para acyl chloride monomer is formed and the crystallinity of the polyamide resin increases, the transparency becomes poor due to haze.

In addition, as the monomers used for the synthesis of the polyamide resin perform the polymerization reaction in a state dissolved in a solvent, the molecular weight of the finally synthesized polyamide resin is difficult to be ensured to a sufficient level due to deterioration by moisture or hybridization with a solvent.

Accordingly, there is a continuing need to develop a polyamide resin capable of realizing transparency and mechanical properties simultaneously.

BRIEF SUMMARY OF THE INVENTION

The present invention provides a polyamide resin film that can secure at least an adequate level of mechanical properties and excellent transparency while improving light resistance against long-term ultraviolet irradiation.

The present invention also provides a resin laminate using the aforementioned polyamide resin film.

One aspect of the present invention provides a polyamide resin film in which a color difference variation rate ($Eab_1$) value on the $1^{st}$ day (n=1) of ultraviolet irradiation according to the following Mathematical Formula 1 is 2.5 or less.

$$Eab_n = \{(L_n - L_{n-1})^2 + (a_n - a_{n-1})^2 + (b_n - b_{n-1})^2\}^{1/2} \quad \text{[Mathematical Formula 1]}$$

wherein, $L_{n-1}$ is a lightness index of the polyamide resin film on the (n−1)th day of ultraviolet irradiation, $a_{n-1}$ and $b_{n-1}$ are color coordinates of the polyamide resin film on the (n−1)th day of ultraviolet irradiation, $L_n$ is a lightness index of the polyamide resin film on the n-th day of ultraviolet irradiation, and $a_n$ and $b_n$ are color coordinates of the polyamide resin film on the n-th day of ultraviolet irradiation.

Another aspect of the present invention provides a resin laminate including a substrate including the polyamide resin film; and a hard coating layer formed on at least one side of the substrate.

DETAILED DESCRIPTION OF THE INVENTION

Hereinafter, a polyamide resin film and a resin laminate using the same according to specific embodiments of the present invention will be described in more detail.

Unless explicitly stated otherwise, the terminology used herein may be defined as follows.

Throughout the specification, when one part "includes" one constituent element, unless otherwise specifically described, this does not mean that another constituent element is excluded, but means that another constituent element may be further included.

In the present specification, examples of the substituents are described below, but are not limited thereto.

As used herein, the term "substituted" means that other functional groups instead of a hydrogen atom in the compound are bonded, and a position to be substituted is not limited as long as the position is a position at which the hydrogen atom is substituted, that is, a position at which the substituent can be substituted, and when two or more are substituted, the two or more substituents may be the same as or different from each other.

As used herein, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; a primary amino group; a carboxy group; a sulfonic acid group; a sulfonamide group; a phosphine oxide group; an alkoxy group; an aryloxy group; an alkylthioxy group: an arylthioxy group; an alkylsulfoxy group; an arylsulfoxy group; a silyl group; a boron group; an alkyl group; a haloalkyl group; a cycloalkyl group; an alkenyl group; an aryl group; an aralkyl group; an aralkenyl group; an alkylaryl group; an alkoxysilylalkyl group; an arylphosphine group; or a heterocyclic group containing at least one of N, O, and S atoms, or being unsubstituted or substituted with a substituent to which two or more substituents are linked among the substituents exemplified above. For example, "the substituent to which two or more substituents are linked" may be a biphenyl group. That is, the biphenyl group may also be an aryl group, and may be interpreted as a substituent to which two phenyl groups are linked. Preferably, a haloalkyl group can be used as the substituent, and examples of the haloalkyl group include trifluoromethyl group.

As used herein, the notation , or  means a bond linked to another substituent group, and a direct bond means the case where no other atoms exist in the parts represented as L.

In the present specification, the alkyl group is a monovalent functional group derived from an alkane, and may be a straight-chain or a branched-chain. The number of carbon atoms of the straight chain alkyl group is not particularly limited, but is preferably 1 to 20. Also, the number of carbon atoms of the branched chain alkyl group is 3 to 20. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethylpropyl, isohexyl, 2-methylpentyl, 4-methylhexyl, 5-methylhexyl, 2,6-dimethylheptane-4-yl and the like, but are not limited thereto.

In the present specification, the aryl group is a monovalent functional group derived from an arene, and is not particularly limited, but preferably has 6 to 20 carbon atoms, and may be a monocyclic aryl group or a polycyclic aryl group. The monocyclic aryl group may include, but not limited to, a phenyl group, a biphenyl group, a terphenyl group, or the like. The polycyclic aryl group may include, but not limited to, a naphthyl group, an anthracenyl group, a phenanthryl group, a pyrenyl group, a perylenyl group, a chrysenyl group, a fluorenyl group or the like. The aryl group may be substituted or unsubstituted.

In the present specification, the arylene group is a bivalent functional group derived from an arene, and the description of the aryl group as defined above may be applied, except that it is a divalent functional group. For example, it may be a phenylene group, a biphenylene group, a terphenylene group, a naphthalenediyl group, a fluorenylene group, a pyrenylene group, a phenanthrenylene group, a perylenediyl group, a tetracenylene group, an anthracenylene group and the like. The arylene group may be substituted or unsubstituted.

In the present specification, a heteroaryl group includes one or more atoms other than carbon, that is, one or more heteroatoms, and specifically, the heteroatom may include one or more atoms selected from the group consisting of O, N, Se, and S, and the like. The number of carbon atoms thereof is not particularly limited, but is preferably 4 to 20, and the heteroaryl group may be monocyclic or polycyclic. Examples of a heteroaryl group include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidinyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group (phenanthroline), a thiazolyl group, an isoxazolyl group, an oxadiazolyl group, a thiadiazolyl group, a benzothiazolyl group, a phenothiazinyl group, an aziridinyl group, an azaindolyl group, an isoindolyl group, an indazolyl group, a purine group (purine), a pteridinyl group (pteridine), a beta-carboline group, a naphthyridinyl group (naphthyridine), a ter-pyridyl group, a phenazinyl group, an imidazopyridyl group, a pyropyridyl group, an azepine group, a pyrazolyl group, a dibenzofuranyl group, and the like, but are not limited thereto. The heteroaryl group may be substituted or unsubstituted.

In the present specification, the hetero arylene group has 2 to 20, or 2 to 10, or 6 to 20 carbon atoms. For the hetero arylene group containing O, N or S as a hetero atom, the description of the heteroaryl group as defined above can be applied except that it is a divalent functional group. The hetero arylene group may be substituted or unsubstituted.

In this specification, examples of halogen include fluorine, chlorine, bromine or iodine.

I. Polyamide Resin Film

According to one embodiment of the present invention, there can be provided a polyamide resin film in which a color difference variation rate ($Eab_1$) value on the 1 day (n=1) of ultraviolet irradiation according to Mathematical Formula 1 is 2.5 or less.

The present inventors have found through experiments that as the polyamide resin film satisfying the conditions in which a color difference variation rate ($Eab_1$) value on the 1 day (n=1) of ultraviolet irradiation according to Mathematical Formula 1 is 2.5 or less suppresses the deformation of the internal molecular structure of the polyamide resin contained in the polyamide resin film by ultraviolet rays, even during long-term ultraviolet irradiation, thereby minimizing discoloration or deterioration of the polyamide resin film and achieving excellent light resistance and stable optical properties. The present invention has been completed on the basis of such findings.

Thereby, even if the polyamide resin film is exposed to an environment where strong ultraviolet rays are irradiated for a long period of time, it can maintain physical properties of a high-strength film while being colorless and transparent, and thus, the field of application of the polyamide resin film can be expanded through low cost and simple steps, which is excellent in terms of economy and efficiency.

Specifically, the polyamide resin film can satisfy a color difference variation rate ($Eab_1$) value on the $1^{st}$ day (n=1) of ultraviolet irradiation according to Mathematical Formula 1 of 2.5 or less, or 0.01 or more and 2.5 or less, or 0.01 or more and 2 or less, or 0.01 or more and 1.5 or less, or 0.01 or more and 1 or less, or 0.05 or more and 0.9 or less, or 0.52811 or more and 0.83295 or less.

More specifically, the color difference variation rate ($Eab_1$) value on the $1^{st}$ day (n=1) of ultraviolet irradiation according to Mathematical Formula 1 may be obtained by the following Mathematical Formula 1-1.

$$Eab_1 = \{(L_1-L_0)^2+(a_1-a_0)^2+(b_1-b_0)^2\}^{1/2}$$ [Mathematical Formula 1-1]

in Mathematical Formula 1-1, $L_0$ is a lightness index of the polyamide resin film on the 0-day of ultraviolet irradiation, $a_0$ and $b_0$ are color coordinates of the polyamide resin film on the 0-day of ultraviolet irradiation, $L_1$ is a lightness index of the polyamide resin film on the $1^{st}$ day of ultraviolet irradiation, and $a_1$ and $b_1$ are color coordinates of the polyamide resin film on the $1^{st}$ day of ultraviolet irradiation.

The polyamide resin film on the 0-day of ultraviolet irradiation means a polyamide resin film that has not been irradiated with ultraviolet rays, and the polyamide resin film on the $1^{st}$ day of ultraviolet irradiation means a polyamide resin film after the ultraviolet irradiation has been performed for one day.

When a color difference variation rate ($Eab_1$) value of the polyamide resin film on the $1^{st}$ day (n=1) of ultraviolet irradiation according to Mathematical Formula 1 is decreased by 2.5 or less, the degree of discoloration and deterioration of the film is not large even if the polyamide resin film is exposed to ultraviolet rays, and thus, it can be applied to the products.

Meanwhile, if the color difference variation rate ($Eab_1$) value of the polyamide resin film on the $1^{st}$ day (n=1) of ultraviolet irradiation according to Mathematical Formula 1 is increased to greater than 2.5, serious discoloration and deterioration may occur such that application of the product is made difficult when the polyamide resin film is exposed to ultraviolet rays.

The lightness index $L_1$ of the polyamide resin film on the $1^{st}$ day of ultraviolet irradiation may be 93 or more, or 95 or more, or 95 or more and 95.75 or less, or 95.5 or more and 95.75 or less, or 95.7 or more and 95.75 or less. Moreover, the color coordinate $a_1$ of the polyamide resin film on the $1^{st}$ day of ultraviolet irradiation may be −1.5 or more, or −1.5 or more and −0.1 or less, or −1.0 or more and −0.5 or less, or −0.8 or more and −0.5 or less, or −0.76 or more and −0.65 or less. And, $b_1$ may be 4 or less, or 1 or more and 4 or less, or 2 or more and 3 or less, or 2.01 or more and 2.15 or less.

Specifically, the lightness index (L) and the color coordinate (a, b) mean values in the coordinate axes representing the intrinsic colors, respectively. L has a value of 0 to 100, a value closer to 0 indicates black colors, and a value closer to 100 indicates white colors, a has positive (+) and negative (−) values with respect to 0 wherein the positive (+) means reddish colors, and the negative (−) means greenish. b has positive (+) and negative (−) values with respect to 0 wherein the positive (+) means yellowish colors, and the negative (−) means bluish colors.

Examples of the method of measuring the lightness index (L) and the color coordinates (a, b) of the polyamide resin film are not particularly limited. For example, a specimen of 5 cm*5 cm size was prepared from the polyamide resin film of the one embodiment, and the specimen was irradiated with ultraviolet light having a light amount of 0.1 w/m$^2$ to 5.0 w/m$^2$ and a wavelength of 315 nm to 380 nm using a QUV Accelerated Weathering Tester of Q-Lab Corporation at a temperature of 20° C. to 70° C. Measurement was performed using a Shimadzu UV-2600 UV-vis spectrometer.

In addition, the color difference variation rate ($Eab_5$) value on the 5th day (n=5) of ultraviolet irradiation according to Mathematical Formula 1 can satisfy 0.2 or less, or 0.01 or more and 0.2 or less, or 0.01 or more and 0.15 or less, or 0.01 or more and 0.1 or less, or 0.095 or more and 0.12627 or less.

More specifically, the value of the color difference variation rate ($Eab_5$) on the 5th day (n=5) of ultraviolet irradiation according to Mathematical Formula 1 can be obtained according to the following Mathematical Formula 1-3.

$$Eab_5 = \{(L_5-L_4)^2 + (a_5-a_4)^2 + (b_5-b_4)^2\}^{1/2} \quad \text{[Mathematical Formula 1-3]}$$

in Mathematical Formula 1-3, $L_4$ is a lightness index of the polyamide resin film on the 4th day of ultraviolet irradiation, $a_4$ and $b_4$ are color coordinates of the polyamide resin film on the 4th day of ultraviolet irradiation, $L_5$ is a lightness index of the polyamide resin film on the 5th day of ultraviolet irradiation, and $a_5$ and $b_5$ are color coordinates of the polyamide resin film on the 5th day of ultraviolet irradiation.

Further, the value of the color difference variation rate ($Eab_{10}$) on the 10th day (n=10) of ultraviolet irradiation according to Mathematical Formula 1 can satisfy 0.1 or less, or 0.01 or more and 0.1 or less, or 0.01 or more and 0.09 or less.

More specifically, the color difference variation rate ($Eab_{10}$) value on the 10th day (n=10) of ultraviolet irradiation according to Mathematical Formula 1 can be obtained according to the following Mathematical Formula 1-4.

$$Eab_{10} = \{(L_{10}-L_9)^2 + (a_{10}-a_9)^2 + (b_{10}-b_9)^2\}^{1/2} \quad \text{[Mathematical Formula 1-4]}$$

in Mathematical Formula 1-4, $L_9$ is a lightness index of the polyamide resin film on the 9th day of ultraviolet irradiation, $a_9$ and $b_9$ are color coordinates of the polyamide resin film on the 9th day of ultraviolet irradiation, $L_{10}$ is a lightness index of the polyamide resin film on the 10th day of ultraviolet irradiation, and $a_{10}$ and $b_{10}$ are color coordinates of the polyamide resin film on the 10th day of ultraviolet irradiation.

That is, the color difference variation rate ($Eab_n$) value on the n-th day of ultraviolet irradiation according to Mathematical Formula 1 generally shows a tendency to decrease as n increases. It can be seen that at the early stage of ultraviolet irradiation where n is 1 to 5, discoloration and deterioration of the polyamide resin film are relatively predominantly proceeded. However, in the polyamide resin film of the one embodiment, even when n is 1 to 5, which is the early stage of ultraviolet irradiation, the color difference variation rate value does not rapidly increase, thereby achieving excellent light resistance.

Specifically, in the polyamide resin film of the embodiment, the color difference variation rate ($Eab_1$) value on the $1^{st}$ day (n=1) of ultraviolet irradiation according to Mathematical Formula 1 may be 20 times or less, or 10 times or less, or 2 times to 20 times, or 2 times to 15 times, or 2 times to 10 times the color difference variation rate ($Eab_{10}$) value on the 10th day (n=10) of ultraviolet irradiation according to Mathematical Formula 1. That is, the value calculated by $Eab_1/Eab_{10}$ may be 20 or less, or 10 or less, or 2 or more and 20 or less, or 2 or more and 15 or less, or 2 or more and 10 or less, or 5 or more and 6 or less.

Meanwhile, after irradiating the polyamide resin film with ultraviolet rays for 1 day, the yellowness index measured according to ASTM E313 may be 7 or less, or 1 or more and 7 or less, or 1 or more and 6 or less, or 1 or more and 5 or less, or 1 or more 4 or less, or 3 or more and 4 or less. Thereby, in the polyamide resin film of the embodiment, the deformation of the internal molecular structure of the polyamide resin contained in the polyamide resin film by ultraviolet rays is suppressed, even at the time of strong ultraviolet irradiation, thus minimizing discoloration or deterioration of the polyamide resin film and achieving excellent light resistance and stable optical properties.

In addition, after irradiating the polyamide resin film with ultraviolet rays for 10 days, the yellowness index measured according to ASTM E313 may be 9 or less, or 1 or more and 9 or less, or 1 or more and 7 or less, or 1 or more and 6 or less. Thereby, in the polyamide resin film of the embodiment, the deformation of the internal molecular structure of the polyamide resin contained in the polyamide resin film by ultraviolet rays is suppressed, even during long-term ultraviolet irradiation, thus minimizing discoloration or deterioration of the polyamide resin film and achieving excellent light resistance and stable optical properties.

Specifically, in the polyamide resin film of the embodiment, the difference between the yellowness index measured according to ASTM E313 after irradiating the polyamide resin film with ultraviolet rays for 10 days, and the yellowness index measured according to ASTM E313 after irradiating the polyamide resin film with ultraviolet rays for 1 day, may be 2.5 or less, or 1 or more and 2.5 or less, or 1.5 or more and 2.5 or less, or 1.6 or more and 2.4 or less, or 1.6 or more and 2.3 or less.

Specifically, the difference between the yellowness index measured according to ASTM E313 after irradiating the polyamide resin film with ultraviolet rays for 10 days, and the yellowness index measured according to ASTM E313 after irradiating the polyamide resin film with ultraviolet rays for $1^{st}$ day means ($YI_{10}-YI_1$) which is the value obtained by subtracting $YI_1$ which is the yellowness index measured according to ASTM E313 after irradiating the polyamide resin film with ultraviolet rays for 1 day, from $YI_{10}$ which is the yellowness index measured according to ASTM E313 after irradiating the polyamide resin film with ultraviolet rays for 10 days.

Meanwhile, the polyamide resin film may have a retardation (Rth) value in the thickness direction at a wavelength of 550 nm in an unstretched state of −8000 nm or more and −3000 nm or less, or −6000 nmn or more and −3000 nmn or less, or −6000 nm or more and −4000 nm or less. Consequently, the yellowness index and the haze value are lowered, the mechanical strength can be improved according to the orientation of the polymer in the film, and the moisture absorbing performance can be lowered.

Further, the polyamide resin film may have a moisture absorption rate according to Mathematical Formula 2 of 0.5% or more and 7.0% or less, or 1.0% or more and 7.0% or less, or 2.0% or more and 7.0% or less, or 2.46% or more and 7.0% or less, or 0.5% or more and 5.0% or less, or 0.5% or more and 3.0% or less, or 2.46% or more and 5.0% or less, or 2.46% or more and 3.0% or less. As it satisfies the moisture absorption rate within the above range together with the above-mentioned thickness direction retardation (Rth) value, the yellowness index and the haze value are reduced, the mechanical strength may be improved according to the orientation of the polymer in the film, and the moisture absorbing performance may be lowered.

The retardation (Rth) value in the thickness direction can be confirmed by a commonly known measurement method and measurement apparatus. For example, the retardation (Rth) value in the thickness direction can be determined using a measuring apparatus manufactured by AXOMETRICS, Inc. under the trade name of "AxoScan", Prism Coupler and the like. In addition, the retardation (Rth) value in the thickness direction can be determined by: inputting a value of a refractive index (550 nm) of the polyamide resin film into the measuring apparatus, then, measuring the thickness-direction retardation value of the polyamide resin film by using light at a wavelength of 550 nm under conditions of a temperature: 25° C. and a humidity: 40%; and converting the measured value of the thickness-direction retardation value thus determined (the value is measured according to the automatic measurement (automatic calculation) of the measuring apparatus) into a retardation value per 10 µm of the thickness of the film. In addition, the size of the polyamide film as the measurement sample is not particularly limited, as long as it is larger than a light measurement unit (diameter: about 1 cm) of a stage of the measuring apparatus. However, the size may be a length: 76 mm, a width: 52 mm, and a thickness: 50 µm.

Further, the value of the "refractive index (550 nm) of the polyamide film" utilized in the measurement of the thickness-direction retardation (Rth) value can be determined by: forming an unstretched film including the same kind of polyamide resin film as the polyamide resin film for forming the film to be measured for the retardation value, and then, measuring the unstretched film as a measurement sample (in the case where the film to be measured is an unstretched film, the film can be directly used as the measurement sample) for the refractive index for light at 550 nm in an in-plane direction (the direction perpendicular to the thickness direction) of the measurement sample by using a refractive index-measuring apparatus (manufactured by AXOMETRICS under the trade name of "Prism Coupler") as a measuring apparatus under a light source of 550 nm and a temperature condition of 23° C.

Further, when the measurement sample is unstretched, the refractive index in the in-plane direction of the film is the same in any direction in the plane, and measuring this refractive index makes it possible to measure the intrinsic refractive index of the polyamide resin film (further, since the measurement sample is unstretched, Nx=Ny is satisfied, where Nx is a refractive index in a direction of a slow axis in the plane, and Ny is a refractive index in an in-plane direction perpendicular to the direction of the slow axis).

In this way, an unstretched film is utilized to measure the intrinsic refractive index (550 nm) of the polyamide resin film, and the measurement value thus obtained is utilized in the measurement of the above-described thickness-direction retardation (Rth) value. Here, the size of the polyamide resin film as a measurement sample is not particularly limited, as long as the size can be utilized in the refractive index-measuring apparatus. The size may be 1 cm square (1 cm in length and width) and 50 µm in thickness.

Generally, a polyamide resin film having a rigid internal structure may have a relatively high haze or yellowness index or a low light transmittance. On the contrary, the polyamide resin film of the embodiment exhibits a thickness-direction retardation (Rth) value described above and has a moisture absorption rate of 3.6% or less even while having a crystalline rigid internal structure, thereby preventing a moisture penetration and the like, and having a low haze value and a high light transmittance.

For this reason, the polyamide resin film can have higher mechanical strength while having lower yellowness index and haze value.

The thickness of the polyamide resin film is not particularly limited, but for example, it can be freely adjusted within the range of 0.01 µm to 1000 µm. If the thickness of the polyamide resin film increases or decreases by a specific value, the physical properties measured in the polyamide resin film may also change by a certain value.

Specifically, the haze measured according to ASTM D1003 for a specimen having a thickness of 50±2 µm may be 3.0% or less, or 1.5% or less, or 1.00% or less, or 0.85% or less, or 0.10% to 3.0%, or 0.10% to 1.5%, or 0.10% to 1.00%, or 0.40% to 1.00%, or 0.40% to 0.90%, or 0.40% to 0.80%. When the haze of the polyamide resin film measured according to ASTM D1003 is increased by more than 3.0%, the opacity is increased and thus, it is difficult to secure a sufficient level of transparency.

The polyamide resin film has a yellowness index (YI) measured for a specimen having a thickness of 50±2 µm according to ASTM E313 of 4.0 or less, or 3.1 or less, or 0.5 to 4.0, or 0.5 to 3.1, or 2.5 to 3.1. When the yellowness index (YI) of the polyamide resin film measured according to ASTM E313 is increased by more than 4.0, the opacity is increased and thus it is difficult to secure a sufficient level of transparency.

Further, the polyamide resin film may have a folding endurance measured for a specimen having a thickness of 50±2 μm (the number of reciprocating bending cycles at an angle of 135°, a rate of 175 rpm, a radius of curvature of 0.8 mm and a load of 250 g) of 4000 cycles or more, or 7000 cycles or more, or 9000 cycles or more, or 4000 cycles to 20000 cycles, or 7000 cycles to 20000 cycles, or 9000 cycles to 20000 cycles, or 10000 cycles or more and 15000 cycles or less, or 10000 cycles or more and 14000 cycles or less.

Further, the polyamide resin film may have a pencil hardness value measured for a specimen having a thickness of 50±2 μm according to ASTM D3363 of 1H or more, or 3H or more, or 1H to 4H, or 3H to 4H.

One example of the components constituting the polyamide resin film in which a color difference variation rate (Eab$_1$) value on the 1$^{st}$ day (n=1) of ultraviolet irradiation according to Mathematical Formula 1 is 2.5 or less may include a polyamide resin containing aromatic amide repeating units derived from a combination of an aromatic diacyl compound and an aromatic diamine compound; and an ultraviolet light stabilizer.

Specifically, the polyamide resin film may include a polyamide resin composition including the polyamide resin and the ultraviolet light stabilizer, or a cured product thereof. The cured product means a material obtained through a curing process of the polyamide resin composition.

The polyamide resin film may be prepared by a conventional method such as a dry method or a wet method using the above-mentioned polyamide resin composition.

For example, the polyamide resin film may be formed by a method of coating a solution containing the polyamide resin and the ultraviolet light stabilizer onto an arbitrary support to form a film, evaporating the solvent from the film and drying it. If necessary, stretching and heat treatment of the polyamide resin film may be further performed.

When the polyamide resin film is produced using the polyamide resin composition, it can realize excellent optical and mechanical properties and at the same time have flexibility and thus, can be used as a material of various molded articles. For example, the polyamide resin film may be applied to a display substrate, a display protective film, a touch panel, a window cover of a foldable device, and the like.

The polyamide resin used in the polyamide resin film may contain aromatic amide repeating units derived from a combination of an aromatic diacyl compound and an aromatic diamine compound.

More specifically, the aromatic amide repeating unit may include one or more repeating units selected from the group consisting of a first aromatic amide repeating unit derived from a combination of a 1,4-aromatic diacyl compound and an aromatic diamine compound; a second aromatic amide repeating unit derived from a combination of a 1,2-aromatic diacyl compound and an aromatic diamine compound; and a tertiary aromatic amide repeating unit derived from a combination of a 1,3-aromatic diacyl compound and an aromatic diamine compound.

That is, the aromatic amide repeating unit may include one type of the first aromatic amide repeating unit derived from a combination of a 1,4-aromatic diacyl compound and an aromatic diamine compound, one type of the second aromatic amide repeating unit derived from a combination of a 1,2-aromatic diacyl compound and an aromatic diamine compound, one type of the third aromatic amide repeating unit derived from a combination of a 1,3-aromatic diacyl compound and an aromatic diamine compound, or mixtures of two or more thereof.

More preferably, the aromatic amide repeating unit may include a first aromatic amide repeating unit derived from a combination of a 1,4-aromatic diacyl compound and an aromatic diamine compound, together with one or more repeating units selected from the group consisting of a second aromatic amide repeating unit derived from a combination of the 1,2-aromatic diacyl compound and the aromatic diamine compound; and a third aromatic amide repeating unit derived from a combination of a 1,3-aromatic diacyl compound and an aromatic diamine compound.

That is, it may include a second aromatic amide repeating unit derived from a combination of the 1,2-aromatic diacyl compound and the aromatic diamine compound and a first aromatic amide repeating unit derived from a combination of the 1,4-aromatic diacyl compound and the aromatic diamine compound, or include a second aromatic amide repeating unit derived from a combination of the 1,3-aromatic diacyl compound and the aromatic diamine compound and a first aromatic amide repeating unit derived from a combination of the 1,4-aromatic diacyl compound and the aromatic diamine compound, or include a second aromatic amide repeating unit derived from a combination of the 1,2-aromatic diacyl compound and the aromatic diamine compound, a second aromatic amide repeating unit derived from a combination of the 1,3-aromatic diacyl compound and the aromatic diamine compound, and a first aromatic amide repeating unit derived from a combination of the 1,4-aromatic diacyl compound and the aromatic diamine compound.

Specific examples of the 1,4-aromatic diacyl compound include terephthaloyl chloride or terephthalic acid. In addition, examples of the aromatic diamine monomer include at least one selected from the group consisting of 2,2'-bis (trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl) sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably the 1,4-aromatic diacyl compound may include terephthaloyl chloride, or terephthalic acid, and the aromatic diamine compound may include 2,2'-bis(trifluoromethyl)-4, 4'-biphenyldiamine.

Specific examples of the 1,2-aromatic diacyl compound include phthaloyl chloride or phthalic acid. In addition, specific examples of the 1,3-aromatic diacyl compound include isophthaloyl chloride or isophthalic acid. Examples of the aromatic diamine monomers include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl] propane, 1,3-bis(4-aminophenoxy)benzene, m-xylylenediamine, p-xylylenediamine and 4,4'-diaminobenzanilide.

Preferably the 1,2-aromatic diacyl compound may include phthaloyl chloride, or phthalic acid, the 1,3-aromatic diacyl compound may include isophthaloyl chloride or isophthalic acid, and the aromatic diamine compound may include 2,2'-bis(trifluoromethyl)-4,4'-biphenyldiamine.

More specifically, the polyamide resin may include a first polyamide segment containing a repeating unit represented by the following Chemical Formula 1, or a block comprised thereof.

[Chemical Formula 1]

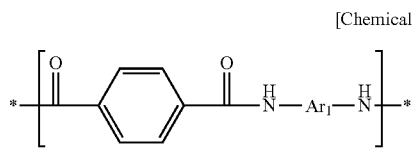

in Chemical Formula 1, $Ar_1$ is a substituted or unsubstituted arylene group having 6 to 20 carbon atoms, or a substituted or unsubstituted heteroarylene group having 2 to 20 carbon atoms.

In Chemical Formula 1, $Ar_1$ is an arylene group having 6 to 20 carbon atoms that is substituted with one or more substituents selected from the group consisting of an alkyl group, a haloalkyl group, and an amino group, and more preferably, it may be a 2,2'-bis(trifluoromethyl)-4,4'-biphenylene group.

More specifically, in Chemical Formula 1, $Ar_1$ may be a divalent organic functional group derived from an aromatic diamine monomer, and specific examples of the aromatic diamine monomer may include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide. More preferably, the aromatic diamine monomer may be 2,2'-bis(trifluoromethyl)-4,4'-biphenyldiamine (TFDB) or 2,2'-dimethyl-4,4'-diaminobenzidine.

The first polyamide segment may include a repeating unit represented by Chemical Formula 1 or a block composed of a repeating unit represented by Chemical Formula 1.

Specific examples of the repeating unit represented by Chemical Formula 1 include a repeating unit represented by the following Chemical Formula 1-1.

[Chemical Formula 1-1]

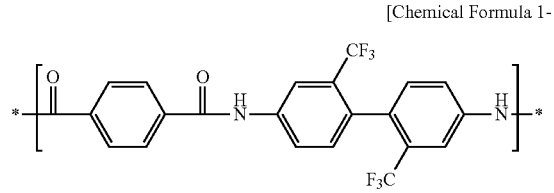

The repeating unit represented by Chemical Formula 1 is an amide repeating unit derived from a combination of a 1,4-aromatic diacyl compound and an aromatic diamine compound, specifically, an amide repeating unit formed by an amidation reaction of terephthaloyl chloride or terephthalic acid with an aromatic diamine monomer. Due to the linear molecular structure, the chain packing and alignment can be kept constant in the polymer, and the surface hardness and mechanical properties of the polyamide film can be improved.

Specific examples of the 1,4-aromatic diacyl compound include terephthaloyl chloride or terephthalic acid. In addition, examples of the aromatic diamine monomer may include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably the 1,4-aromatic diacyl compound may include terephthaloyl chloride, or terephthalic acid, and the aromatic diamine compound may include 2,2'-bis(trifluoromethyl)-4,4'-biphenyldiamine.

The first polyamide segment may have a number average molecular weight of 100 g/mol or more and 5000 g/mol or less, or 100 g/mol or more and 3000 g/mol or less, or 100 g/mol or more and 2500 g/mol or less, or 100 g/mol or more and 2450 g/mol or less. When the number average molecular weight of the first polyamide segment is increased by more than 5000 g/mol, the chains of the first polyamide segment become excessively long and thus the crystallinity of the polyamide resin can be increased. Consequently, it may have a high haze value and it may be difficult to secure transparency. Examples of the measuring method of the number average molecular weight of the first polyamide segment is not limited, but for example, it can be confirmed through a small-angle X-ray scattering (SAXS) analysis.

The first polyamide segment may be represented by the following Chemical Formula 5.

[Chemical Formula 5]

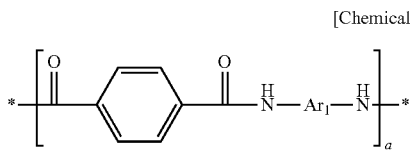

in Chemical Formula 5, $Ar_1$ is a substituted or unsubstituted arylene group having 6 to 20 carbon atoms, or a substituted or unsubstituted heteroarylene group having 2 to 20 carbon atoms, and a is an integer of 1 to 5. In Chemical Formula 5, when a is 1, the Formula 5 may be a repeating unit represented by Chemical Formula 1. In Chemical Formula 5, when a is 2 to 5, the Formula 5 may be a block composed of repeating units represented by Chemical Formula 1. In Chemical Formula 5, the details concerning $Ar_1$ includes those described above in Chemical Formula 1.

Based on the total repeating units contained in the polyamide resin, the ratio of the repeating units represented by Chemical Formula 1 may be 40 mol % to 95 mol %, 50 mol % to 95 mol %, or 60 mol % to 95 mol %, or 70 mol % to 95 mol %, or 50 mol % to 90 mol %, or 50 mol % to 85 mol %, or 60 mol % to 85 mol %, or 70 mol % to 85 mol %, or 80 mol % to 85 mol %, or 82 mol % to 85 mol %.

In this manner, the polyamide resin in which the repeating unit represented by Chemical Formula 1 is contained in the above-described content can ensure a sufficient level of molecular weight, thereby ensuring excellent mechanical properties.

In addition, the polyamide resin may further include a second polyamide segment containing a repeating unit represented by the following Chemical Formula 2, or a block composed thereof, in addition to the first polyamide segment containing a repeating unit represented by Chemical Formula 1, or a block composed thereof.

The repeating unit represented by Chemical Formula 2 may include an amide repeating unit derived from a combination of a 1,3-aromatic diacyl compound and an aromatic diamine compound, or a repeating unit derived from a combination of a 1,2-aromatic diacyl compound and an aromatic diamine compound, or mixtures thereof.

[Chemical Formula 2]

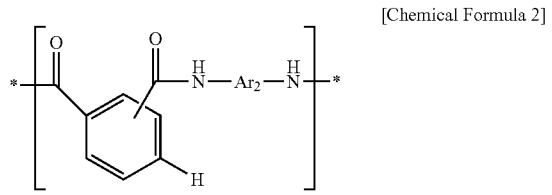

in Chemical Formula 2, $Ar_2$ is a substituted or unsubstituted arylene group having 6 to 20 carbon atoms, or a substituted or unsubstituted heteroarylene group having 2 to 20 carbon atoms.

In Chemical Formula 2, $Ar_2$ is an arylene group having 6 to 20 carbon atoms that is substituted with one or more substituents selected from the group consisting of an alkyl group, a haloalkyl group, and an amino group. More preferably, it may be a 2,2'-bis(trifluoromethyl)-4,4'-biphenylene group.

More specifically, in Chemical Formula 2, $Ar_2$ may be a divalent organic functional group derived from an aromatic diamine monomer. Specific examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide. More preferably, the aromatic diamine monomer may be 2,2'-bis(trifluoromethyl)-4,4'-biphenyldiamine (TFDB) or 2,2'-dimethyl-4,4'-diaminobenzidine.

The second polyamide segment may include a repeating unit represented by Chemical Formula 2, or a block composed of the repeating unit represented by Chemical Formula 2.

More specifically, the repeating unit represented by Chemical Formula 2 may include one type of repeating unit selected from a repeating unit represented by the following Chemical Formula 2-1; or a repeating unit represented by Chemical Formula 2-2.

[Chemical Formula 2-1]

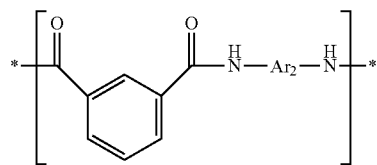

[Chemical Formula 2-2]

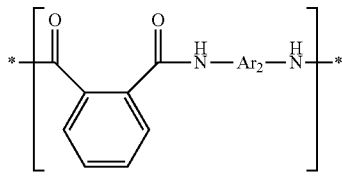

in Chemical Formulas 2-1 to 2-2, $Ar_2$ is a substituted or unsubstituted arylene group having 6 to 20 carbon atoms, or a substituted or unsubstituted heteroarylene group having 2 to 20 carbon atoms. The details concerning $Ar_2$ includes those described above in Chemical Formula 2.

The repeating unit represented by Chemical Formula 2-1 is an amide repeating unit derived from a combination of a 1,3-aromatic diacyl compound and an aromatic diamine compound, specifically, a repeating unit formed by an amidation reaction of isophthaloyl chloride or isophthalic acid with an aromatic diamine monomer, and the repeating unit represented by Chemical Formula 2-2 is an amide repeating unit derived from a combination of a 1,2-aromatic diacyl compound and an aromatic diamine compound, specifically a repeating unit formed by an amidation reaction of phthaloyl chloride or phthalic acid with an aromatic diamine monomer.

Specific examples of the 1,2-aromatic diacyl compound include phthaloyl chloride or phthalic acid. In addition, specific examples of the 1,3-aromatic diacyl compound include isophthaloyl chloride or isophthalic acid. Examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

Preferably, the 1,2-aromatic diacyl compound may include phthaloyl chloride, or phthalic acid, the 1,3-aromatic diacyl compound may include isophthaloyl chloride or isophthalic acid, and the aromatic diamine compound may include 2,2'-bis(trifluoromethyl)-4,4'-biphenyldiamine.

Specific examples of the repeating unit represented by Chemical Formula 2-1 include a repeating unit represented by the following Chemical Formula 2-4.

[Chemical Formula 2-4]

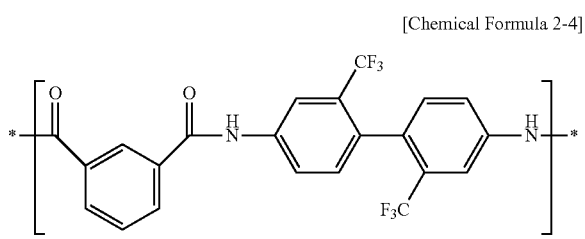

Specific examples of the repeating unit represented by Chemical Formula 2-2 include a repeating unit represented by the following Chemical Formula 2-5.

[Chemical Formula 2-5]

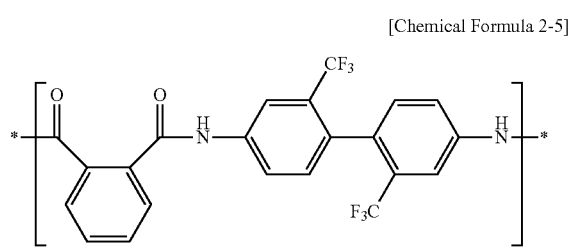

On the other hand, the second polyamide segment may be represented by the following Chemical Formula 6.

[Chemical Formula 6]

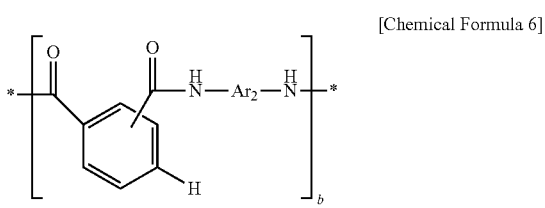

in Chemical Formula 6, $Ar_2$ is a substituted or unsubstituted arylene group having 6 to 20 carbon atoms, or a substituted or unsubstituted heteroarylene group having 2 to 20 carbon atoms, and b is an integer of 1 to 3, or 1 to 2. In Chemical Formula 6, when b is 1, the Formula 6 may be a repeating unit represented by Chemical Formula 2. In Chemical Formula 6, when b is 2 to 3, the Formula 6 may be a block composed of repeating units represented by Chemical Formula 2.

The repeating unit represented by Chemical Formula 2 is a repeating unit formed by an amidation reaction of isophthaloyl chloride, isophthalic acid or phthaloyl chloride, phthalic acid and an aromatic diamine monomer. Due to the curved molecular structure, it has the property of interfering with chain packing and alignment within the polymer, and it is possible to increase the amorphous region in the polyamide resin and thus improve the optical properties and the folding endurance of the polyamide film. In addition, as this is included in the polyamide resin together with the repeating unit represented by Chemical Formula 1, it is possible to increase the molecular weight of the polyamide resin.

Based on the total repeating units contained in the polyamide resin, the ratio of the repeating unit represented by Chemical Formula 2 may be 5 mol % to 60 mol %, or 5 mol % to 50 mol %, or 5 mol % to 40 mol %, or 5 mol % to 30 mol %, or 10 mol % to 50 mol %, or 15 mol % to 50 mol %, or 15 mol % to 40 mol %, or 15 mol % to 30 mol %, or 15 mol % to 20 mol %, or 15 mol % to 18 mol %.

In this manner, the polyamide resin in which the repeating unit represented by Chemical Formula 2 is contained in the above-described content can suppress the growth of the length of the chains consisting of only the specific repeating unit represented by Chemical Formula 1 and thus lower the crystallinity of the resin. Consequently, it is possible to have a low haze value and thus secure excellent transparency.

More specifically, based on the total repeating units contained in the polyamide resin, the content of the repeating unit represented by Chemical Formula 1 may be 60 mol % to 95 mol %, or 70 mol % to 95 mol %, or 50 mol % to 90 mol %, or 50 mol % to 85 mol %, or 60 mol % to 85 mol %, or 70 mol % to 85 mol %, or 80 mol % to 85 mol %, or 82 mol % to 85 mol %, and the content of the repeating unit represented by Chemical Formula 2 may be 5 mol % to 40 mol %, or 5 mol % to 30 mol %, or 10 mol % to 50 mol %, or 15 mol % to 50 mol %, or 15 mol % to 40 mol %, or 15 mol % to 30 mol %, or 15 mol % to 20 mol %, or 15 mol % to 18 mol %.

That is, the polyamide resin can increase the molar content of the repeating unit represented by Chemical Formula 1 and thus maximize the effect of improving the surface hardness and mechanical properties of the polyamide film according to the chain packing and alignment within the polymer due to the linear molecular structure of the repeating unit represented by Chemical Formula 1. In addition, although the repeating unit represented by Chemical Formula 2 has a relatively low molar content, it may suppress the length growth of the chain consisting of only the specific repeating unit represented by Chemical Formula 1, thereby lowering the crystallinity of the resin. Consequently, it is possible to have a low haze value and thus secure excellent transparency.

On the other hand, the first polyamide segment and the second polyamide segment may form a backbone chain including an alternating repeating unit represented by the following Chemical Formula 3.

[Chemical Formula 3]

in Chemical Formula 3, A is the first polyamide segment, and B is the second polyamide segment.

Specifically, the backbone chain of the polyamide resin may form a polymer chain consisting of alternating structure of: a first polyamide segment containing an amide repeating unit derived from a combination of a 1,4-aromatic diacyl compound and an aromatic diamine compound, and a second polyamide segment containing an amide repeating unit derived from a combination of a 1,3-aromatic diacyl compound and an aromatic diamine compound, or an amide repeating unit derived from a combination of a 1,2-aromatic diacyl compound and an aromatic diamine compound, as shown in Chemical Formula 3. That is, the second polyamide segment is positioned between the first polyamide segments, and may serve to suppress the growth of the length of the first polyamide segment.

In this manner, when the growth of the length of the first polyamide segment is suppressed, the haze value of the polyamide resin can be remarkably lowered while the crystal properties are reduced, thereby achieving excellent transparency.

Meanwhile, "the backbone chain of the polyamide resin forms a polymer chain consisting of alternating structure of: a first polyamide segment derived from terephthaloyl chloride or terephthalic acid and a second polyamide segment derived from isophthaloyl chloride, isophthalic acid or phthaloyl chloride, or phthalic acid, as shown in Chemical Formula 3" is considered to be due to the formation of a melt-kneaded complex in the preparation method of the polyamide resin of the present invention described hereinafter.

When explanation is made by enumerating concrete examples, the alternating repeating unit represented by Chemical Formula 3 may be a repeating unit represented by the following Chemical Formula 4.

[Chemical Formula 4]

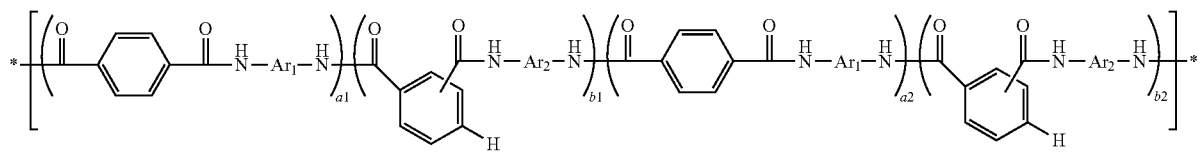

in Chemical Formula 4, $Ar_1$ and $Ar_2$ are each independently a substituted or unsubstituted arylene group having 6 to 20 carbon atoms, or a substituted or unsubstituted heteroarylene group having 2 to 20 carbon atoms, a1 and a2 are the same as or different from each other and are each independently an integer of 1 to 10, or 1 to 5, and b1 and b2 are the same as or different from each other and are each independently an integer of 1 to 5, or 1 to 3.

That is, the polyamide resin may include a first polyamide segment containing a repeating unit represented by Chemical Formula 1 or a block composed thereof; and a second polyamide segment containing a repeating unit represented by Chemical Formula 2, or a block composed thereof, wherein the first polyamide segment and the second polyamide segment may form a backbone chain including an alternating repeating unit represented by Chemical Formula 3.

Specifically, the backbone chain of the polyamide resin may form a polymer chain consisting of alternating structure of: crystalline polymer blocks derived from terephthaloyl chloride or terephthalic acid (hereinafter, referred to as the first polyamide segment) and amorphous polymer block derived from isophthaloyl chloride, isophthalic acid or phthaloyl chloride, phthalic acid (hereinafter, the second polyamide segment). In other words, the second polyamide segment is positioned between the first polyamide segments, and may serve to suppress the growth of the length of the first polyamide segment.

In this case, the first polyamide segment is included in the individual crystals of the polyamide resin to express crystal properties, and the second polyamide segment is included in an amorphous polymer chain between the individual crystals to express amorphous properties.

Therefore, when the length growth of the first polyamide segment is suppressed, the polyamide resin can remarkably reduce the haze value while reducing the crystal characteristics of the first polyamide segment, and therefore, it is possible to achieve excellent transparency.

Meanwhile, when the length growth suppression effect of the first polyamide segment by the second polyamide segment is reduced, and the length growth of the first polyamide segment proceeds excessively, the polyamide resin may have poor transparency while increasing the crystal characteristics of the first polyamide segment and rapidly increasing the haze value.

And yet, the polyamide resin can have a sufficient level of weight average molecular weight, whereby a sufficient level of mechanical properties can also be achieved.

The polyamide resin may have a weight average molecular weight of 330000 g/mol or more, 420000 g/mol or more, or 500000 g/mol or more, or 330000 g/mol to 1000000 g/mol, or 420000 g/mol to 1000000 g/mol, or 500000 g/mol to 1000000 g/mol, or 420000 g/mol to 800000 g/mol, or 420000 g/mol to 600000 g/mol, or 450000 g/mol to 550000 g/mol.

The reason why the weight average molecular weight of the polyamide resin is measured to be high is considered to be due to the formation of a melt-kneaded complex in the preparation method of the polyamide resin of another embodiment of the present invention described hereinafter. When the weight average molecular weight is reduced to less than 330,000 g/mol, the polyamide resin has a problem that mechanical properties such as flexibility and pencil hardness are lowered.

The polydispersity index of the polyamide resin may be 3.0 or less, or 2.9 or less, or 2.8 or less, or 1.5 to 3.0, or 1.5 to 2.9, or 1.6 to 2.8, or 1.8 to 2.8. Through such narrow range of polydispersity index, the polyamide resin can improve mechanical properties such as bending properties or hardness properties. When the polydispersity index of the polyamide resin becomes too wide by more than 3.0, there is a limit that it is difficult to improve the above-described mechanical properties to a sufficient level.

The haze of the polyamide resin measured according to ASTM D1003 may be 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.80% to 1.00%, or 0.81% to 0.97%. When the haze of the polyamide resin measured according to ASTM D1003 is increased by more than 3.0%, the opacity is increased and thus it is difficult to secure a sufficient level of transparency.

Preferably, the polyamide resin satisfies the weight average molecular weight of 330000 g/mol or more, 420000 g/mol or more, or 500000 g/mol or more, or 330000 g/mol to 1000000 g/mol, or 420000 g/mol to 1000000 g/mol, or 500000 g/mol to 1000000 g/mol, or 420000 g/mol to 800000 g/mol, or 420000 g/mol to 600000 g/mol, or 450000 g/mol to 550000 g/mol, and simultaneously it may have the haze measured according to ASTM D1003 of 3.0% or less, or 1.5% or less, 1.00% or less, or 0.85% or less, or 0.10% to 3.0%, or 0.10% to 1.5%, or 0.10% to 1.00%, or 0.50% to 1.00%, or 0.80% to 1.00%, or 0.81% to 0.97%.

The relative viscosity of the polyamide resin (measured according to ASTM D 2196) may be 45000 cps or more, or 60000 cps or more, or 45000 cps to 500000 cps, or 60000 cps to 500000 cps, or 70000 cps to 400000 cps, or 80000 cps to 300000 cps, or 100000 cps to 200000 cps, or 110000 cps to 174000 cps. When the relative viscosity of the polyamide resin (measured according to ASTM D 2196) is reduced to less than 45000 cps, there is a limit that in the film molding process using the polyamide resin, the molding processability is lowered and the efficiency of the molding process is lowered.

As an example of a method for preparing the polyamide resin, a method for preparing a polyamide resin including a step of melt-kneading a compound represented by the following Chemical Formula 7 and a compound represented by the following Chemical Formula 8, and solidifying the melt-kneaded product to form a complex; and a step of reacting the complex with an aromatic diamine monomer can be used.

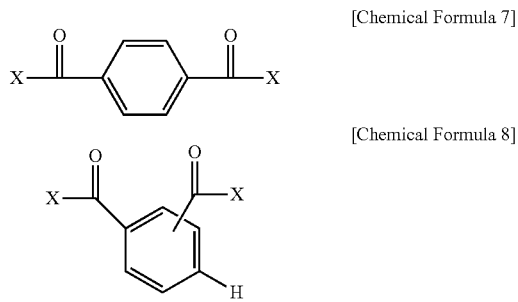

[Chemical Formula 7]

[Chemical Formula 8]

in Chemical Formulas 7 to 8, X is a halogen or a hydroxyl group.

The present inventors have found through experiments that when the compound represented by Chemical Formula 7 and the compound represented by Chemical Formula 8 are mixed at a temperature equal to or higher than the melting point as in the method for preparing the polyamide resin, it is possible to prepare a complex of monomers mixed uniformly through the melting of the compound represented by Chemical Formula 7 and the compound represented by Chemical Formula 8, and that as this complex is reacted with an aromatic diamine monomer, an amide repeating unit derived from the compound represented by Chemical Formula 7, or a block composed thereof, and an amide repeating uniting derived from the compound represented by Chemical Formula 8, or a block composed thereof can be alternatively polymerized, thereby completing the present invention.

That is, the polyamide resin of one embodiment can be obtained by the preparation method of the polyamide resin.

Specifically, each of the compound represented by Chemical Formula 7 and the compound represented by Chemical Formula 8 exhibits different aspects in solubility and reactivity due to chemical structural differences. Therefore, even when they are added simultaneously, there is a limit in that the amide repeating unit derived from the compound represented by Chemical Formula 7 is predominantly formed and simultaneously long blocks are formed, thereby increasing the crystallinity of the polyamide resin and making it difficult to secure transparency.

Thus, in the preparation method of the polyamide resin, the compound represented by Chemical Formula 7 and the compound represented by Chemical Formula 8 are not simply physically mixed, but through the formation of a complex by melt-kneading at a temperature higher than each melting point, each monomer was induced to react relatively evenly with the aromatic diamine monomer.

Meanwhile, when synthesizing existing polyamide resin, as the compound represented by Chemical Formula 7 and the compound represented by Chemical Formula 8 are dissolved in a solvent and then reacted with an aromatic diamine monomer in a solution state, there was a limit in that due to the deterioration by moisture or mixing in solvents, the molecular weight of the finally synthesized polyamide resin decreases. Further, due to the difference in the solubility of the compound represented by Chemical Formula 7 and the compound represented by Chemical Formula 8, the amide repeating unit derived from the compound represented by Chemical Formula 7 is predominantly formed and simultaneously long blocks are formed, thereby increasing the crystallinity of the polyamide resin and making it difficult to secure transparency.

Thus, in the preparation method of the polyamide resin, as a complex obtained by melt-kneading the compound represented by Chemical Formula 7 and the compound represented by Chemical Formula 8 are reacted with the aromatic diamine monomer dissolved in the organic solvent in the form of a solid powder through cooling at a temperature lower than each melting point (minus 10° C. to plus 30° C., or 0° C. to plus 30° C., or plus 10° C. to plus 30° C.), it was confirmed that the molecular weight of the finally synthesized polyamide resin is improved, and it was confirmed therefrom that excellent mechanical properties are secured.

Specifically, the method for preparing the polyamide resin may include melt-kneading the compound represented by Chemical Formula 7 and the compound represented by Chemical Formula 8, and solidifying the melt-kneaded product to form a complex.

In the compound represented by Chemical Formula 7, X is a halogen or a hydroxyl group. Preferably, in Chemical Formula 7, X is chlorine. Specific examples of the compound represented by Chemical Formula 7 include terephthaloyl chloride or terephthalic acid.

The compound represented by Chemical Formula 7 may form a repeating unit represented by Chemical Formula 1 by an amidation reaction of an aromatic diamine monomer. Due to the linear molecular structure, the chain packing and alignment can be kept constant in the polymer, and the surface hardness and mechanical properties of the polyamide film can be improved.

In the compound represented by Chemical Formula 8, X is a halogen or a hydroxyl group. Preferably, in Chemical Formula 8, X is chlorine. Specific examples of the compound represented by Chemical Formula 8 include phthaloyl chloride, phthalic acid, isophthaloyl chloride, or isophthalic acid.

The compound represented by Chemical Formula 8 may form a repeating unit represented by Chemical Formula 2 by an amidation reaction of an aromatic diamine monomer. Due to the curved molecular structure, it has the property of interfering with chain packing and alignment within the polymer, and it is possible to increase the amorphous region in the polyamide resin and thus improve the optical properties and the folding endurance of the polyamide film. In addition, as this is included in the polyamide resin together with the repeating unit represented by Chemical Formula 1, it is possible to increase the molecular weight of the polyamide resin.

Meanwhile, in the step of melt-kneading a compound represented by Chemical Formula 7 and a compound represented by Chemical Formula 8, and solidifying the melt-kneaded product to form a complex, the melt-kneading means mixing the compound represented by Chemical Formula 7 and the compound represented by Chemical Formula 8 at a temperature equal to or higher than the melting point.

In this manner, the compound represented by Chemical Formula 7 and the compound represented by Chemical Formula 8 are not simply physically mixed, but through the formation of a complex by melt-kneading at a temperature higher than each melting point, each monomer can be induced to react relatively evenly with the aromatic diamine monomer.

Due to the difference in the solubility of the compound represented by Chemical Formula 7 and the compound represented by Chemical Formula 8, the amide repeating unit derived from the compound represented by Chemical Formula 7 is predominantly formed and simultaneously long blocks are formed, thereby increasing the crystallinity of the polyamide resin and making it difficult to secure transparency. Therefore, in order to solve these limitations, the first polyamide segment and the second polyamide segment can alternately form a backbone chain including the alternating repeating units represented by Chemical Formula 3 as in one embodiment.

At this time, with respect to 100 parts by weight of the compound represented by Chemical Formula 7, the compound represented by Chemical Formula 8 may be mixed at 5 parts by weight to 60 parts by weight, or 5 parts by weight to 50 parts by weight, or 5 parts by weight to 25 parts by weight, or 10 parts by weight to 30 parts by weight, or 15 parts by weight to 25 parts by weight. Thereby, the technical effect of increasing transmittance and clarity can be realized. When the compound represented by Chemical Formula 8 is mixed in an excessively small amount of less than 5 parts by weight with respect to 100 parts by weight of the compound represented by Chemical Formula 7, the technical problems such as becoming opaque and the increase of haze may occur. When the compound represented by Chemical Formula 8 is mixed in an excessively high amount of more than 60 parts by weight with respect to 100 parts by weight of the compound represented by Chemical Formula 7, the technical problems such as the reduction of physical properties (hardness, tensile strength, etc.) may occur.

In addition, in forming the complex by solidifying the melt-kneaded product, the solidifying means a physical change in which the molt-kneaded product in a molten state is cooled to a temperature equal to or less than the melting point and solidified. Consequently, the formed complex may be in a solid state. More preferably, the complex may be a solid powder obtained through an additional grinding process or the like.

Meanwhile, the step of melt-kneading a compound represented by Chemical Formula 7 and a compound represented by Chemical Formula 8, and solidifying the melt-kneaded product to form a complex may include a step of mixing the compound represented by Chemical Formula 7 and the compound represented by Chemical Formula 8 at a temperature of 50° C. or higher; and a step of cooling the result of the mixing step.

The terephthaloyl chloride has a melting point of 81.3° C. to 83° C., the isophthaloyl chloride has a melting point of 43° C. to 44° C., and the phthaloyl chloride may have a melting point of 6° C. to 12° C. Thereby, when these are mixed at a temperature of 50° C. or higher, or 90° C. or higher, or 50° C. to 120° C., or 90° C. to 120° C., or 95° C. to 110° C., or 100° C. to 110° C., these are the temperature condition higher than the melting point of both the compound represented by Chemical Formula 7 and the compound represented by Chemical Formula 8 and thus, melt-kneading may be performed.

In the step of cooling the result of the mixing step, the result of the melt-kneading step is left at plus 5° C. or below, or minus 10° C. to plus 5° C., or minus 5° C. to plus 5° C., which is a temperature condition lower than the melting point of both the compound represented by Chemical Formula 7 and the compound represented by Chemical Formula 8, so that a more uniform solid powder can be obtained through cooling.

Meanwhile, after the step of cooling the result of the mixing step, the method may further include a step of grinding the result of the cooling step. Through the grinding step, a solid complex can be prepared in powder form, and the powder obtained after the grinding step may have an average particle size of 1 mm to 10 mm.

Grinders used for grinding with such particle sizes specifically include a pin mill, a hammer mill, a screw mill, a roll mill, a disc mill, a jog mill or sieve, a jaw crusher, and the like, but are not limited to the examples described above.

In this manner, as the melt mixture of the compound represented by Chemical Formula 7 and the compound represented by Chemical Formula 8 is reacted with the aromatic diamine monomer in the form of solids, specifically solid powders, through the cooling at a temperature lower than the melting point, the deterioration of the compound represented by Chemical Formula 7 and the compound represented by Chemical Formula 8 due to moisture or their mixing in solvents is minimized, the molecular weight of the finally synthesized polyamide resin is increased, and thereby excellent mechanical properties of the polyamide resin can be ensured.

In addition, after the step of melt-kneading a compound represented by the following Chemical Formula 7 and a compound represented by the following Chemical Formula 8, and solidifying the melt-kneaded product to form a complex, the method for preparing the polyamide resin may include a step of reacting the complex with an aromatic diamine monomer.

The reaction in the step of reacting the complex with an aromatic diamine monomer may be performed under an inert gas atmosphere at a temperature condition of minus 25° C. to plus 25° C. or a temperature condition of minus 25° C. to 0° C.

Specific examples of the aromatic diamine monomer include at least one selected from the group consisting of 2,2'-bis(trifluoromethyl)-4,4'-biphenyldiamine, 2,2'-dimethyl-4,4'-diaminobenzidine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, m-xylylenediamine, p-xylylenediamine and 4,4'-diaminobenzanilide.

More preferably, as the aromatic diamine monomer, 2,2'-bis(trifluoromethyl)-4,4'-biphenyldiamine (TFDB), 2,2'-dimethyl-4,4'-diaminobenzidine, m-xylylenediamine, or p-xylylenediamine can be used.

More specifically, the step of reacting the complex with an aromatic diamine monomer may include a step of dissolving the aromatic diamine monomer in an organic solvent to prepare a diamine solution; and a step of adding a complex powder to the diamine solution.

In the step of dissolving the aromatic diamine monomer in an organic solvent to prepare a diamine solution, the aromatic diamine monomer included in the diamine solution may be present in a state dissolved in an organic solvent.

Examples of the solvent are not particularly limited, but for example, common general-purpose organic solvents such as N-methylformamide, N,N-dimethylformamide, N,N-diethylformamide, N,N-dimethylacetamide, N,N-diethylacetamide, N,N-dimethylpropionamide, 3-methoxy-N,N-dimethylpropionamide, dimethyl sulfoxide, acetone, N-methyl-2-pyrrolidone, N-ethyl-2-pyrrolidone, tetrahydrofuran, chloroform, gamma-butyrolactone, ethyl lactate, methyl 3-methoxypropionate, methyl isobutyl ketone, toluene, xylene, methanol, ethanol, or the like can be used without limitation.

In the step of adding a complex powder to the diamine solution, the complex powder will react with the aromatic diamine monomer dissolved in the diamine solution. As a result, the deterioration of the compound represented by Chemical Formula 7 and the compound represented by Chemical Formula 8 due to moisture, or their mixing in solvents is minimized, the molecular weight of the finally synthesized polyamide resin is increased, and thereby excellent mechanical properties of the polyamide resin can be ensured.

After the step of cooling the result of the mixing step, the complex powder can prepare a complex of solids in the form of powder through the step of grinding the result of the cooling step. The powder obtained after the grinding step may have an average particle size of 1 mm to 10 mm.

Meanwhile, the ultraviolet light stabilizer is a material added for the UV stability, and various substances that are commercially available, such as Tinuvin 144, Tinuvin 292, Tinuvin 327, Tinuvin 329, Tinuvin 5050, Tinuvin 5151 from BASF Corporation, and LOWILITE 22 and LOWILITE 26, LOWILITE 55, LOWILITE 62, LOWILITE 94 from Miwon Commercial Co., etc. can be used, but the present invention is not limited thereto.

However, in the polyamide resin film of the embodiment, only one type of a triazine-based UV absorber, a triazole-based UV absorber, and a HALS (hindered amine light stabilizer)-based UV absorber and the like may be used as the ultraviolet light stabilizer, or two or more types may be used together.

The triazine-based UV absorber may include commercially available Tinuvin 360, Tinuvin 1577 (Ciba Chemicals), Cyasorb UV-1164, Cyasorb UV-2908, Cyasorb UV-3346 (Cytec), Tinuvin T1600 (BASF), LA-F70 (ADEKA), and the like, the triazole-based UV absorber may include Tinuvin 329, Tinuvin 384, Tinuvin 1130, Cyasorb UV-2337, Cyasorb UV-5411, Eversorb 109 (Everlight Chemical), and the like, and the HALS-based UV absorber may include Cyasorb UV-3853 and the like.

In particular, when using a triazole-based UV absorber, not only excellent light resistance but also stable optical properties can be achieved, and the triazole-based UV absorber may include a compound represented by the following Chemical Formula 11.

[Chemical Formula 11]

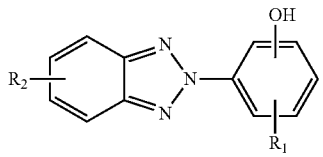

in Chemical Formula 11, $R_1$ and $R_2$ are each independently hydrogen or an alkyl group having 1 to 20 carbon atoms. More preferably, in Chemical Formula 1, Tinuvin 329 (BASF) wherein $R_1$ is 2,4,4-trimethylpentan-2-yl and $R_2$ is hydrogen, may be mentioned.

The ultraviolet light stabilizer may be added in an amount of about 0.1 part by weight to about 20 parts by weight or about 1 part by weight to about 10 parts by weight based on 100 parts by weight of the polyamide resin. This is because when the content of the ultraviolet light stabilizer satisfies the above range, both the optical properties of the film and the UV-shielding effect are excellent.

When the ultraviolet light stabilizer is added in an excessively small amount compared to the polyamide resin, it is difficult to sufficiently realize UV light resistance by the ultraviolet light stabilizer, When the ultraviolet light stabilizer is added in an excessive amount compared to the polyamide resin, the initial yellowness index of the polyamide resin film is higher than the reference value and simultaneously, transparency of the film can be decreased.

II. Resin Laminate

According to another aspect of the present invention, there can be provided a resin laminate including a substrate including the polyamide resin film of one embodiment; and a hard coating layer formed on at least one side of the substrate.

The substrate may include the polyamide resin film of one embodiment, and the details concerning the polyamide resin film may include all of those described in the one embodiment.

A hard coating layer may be formed on at least one side of the substrate. A hard coating layer may be formed on one side or both sides of the substrate. When the hard coating layer is formed only on one side of the substrate, a polymer film including one or more polymers selected from the group consisting of polyimide-based, polycarbonate-based, polyester-based, polyalkyl(meth)acrylate-based, polyolefin-based and polycyclic olefin-based polymers may formed on the opposite side of the substrate.

The hard coating layer may have a thickness of 0.1 μm to 100 μm.

The hard coating layer can be used without particular limitation as long as it is a material known in the field of hard coating. For example, the hard coating layer may include a binder resin of photocurable resin; and inorganic particles or organic particles dispersed in the binder resin.

The photocurable resin contained in the hard coating layer is a polymer of a photocurable compound which can cause a polymerization reaction when irradiated with light such as ultraviolet rays, and may be one conventionally used in the art. However, preferably, the photocurable compound may be a polyfunctional (meth)acrylate-based monomer or oligomer. At this time, it is advantageous in terms of ensuring the physical properties of the hard coating layer that the number of (meth)acrylate-based functional groups is 2 to 10, 2 to 8, or 2 to 7. Alternatively, the photocurable compound may be at least one selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trilene diisocyanate, xylene diisocyanate, hexamethylene diisocyanate, trimethylolpropane tri(meth)acrylate, and trimethylolpropane polyethoxy tri(meth)acrylate.

The inorganic particles may be, for example, metal atoms such as silica, aluminum, titanium, or zinc, or oxides or nitrides thereof. Silica fine particles, aluminum oxide particles, titanium oxide particles, zinc oxide particles, and the like can be used independently of each other.

The inorganic particles may have an average radius of 100 nm or less, or 5 to 100 nm. The type of the organic particles is not limited, and for example, polymer particles having an average particle size of 10 nm to 100 μm may be used.

The resin laminate can be used as a substrate or a cover window of a display device, or the like. It has high flexibility and bending durability together with high transmittance and low haze properties, so that it can be used as a substrate or cover window of a flexible display device. That is, the display device including the resin laminate, or the flexible display device including the resin laminate may be implemented.

According to the present invention, there can be provided a polyamide resin film that can secure at least an adequate level of mechanical properties and transparency while improving light resistance against long-term ultraviolet irradiation, and a resin laminate using the same.

BRIEF DESCRIPTION OF DRAWINGS

FIG. 1 shows a $^{13}$C-NMR spectrum of the polyamide resin obtained in (1) of Example 1.

FIG. 2 shows a $^{13}$C-NMR spectrum of the polyamide resin obtained in (1) of Example 2.

Hereinafter, embodiments of the present invention will be described in more detail by way of examples. However, these examples are presented for illustrative purposes only, and are not intended to limit the scope of the present invention.

PREPARATION EXAMPLE: PREPARATION OF ACYL CHLORIDE COMPLEX

Preparation Example 1

569.5 g (2.803 mol) of terephthaloyl chloride (TPC; melting point: 83° C.) and 100.5 g (0.495 mol) of isophthaloyl chloride (IPC; melting point: 44° C.) were added to a 1000 mL 4-neck round flask (reactor) equipped with a stirrer, a nitrogen injection device, a dropping funnel and a temperature controller, and the mixture was melt-kneaded at 100° C. for 3 hours and then cooled at 0° C. for 12 hours to prepare a complex of acylchloride (specifically, terephthaloyl chloride and isophthaloyl chloride).

Subsequently, the acyl chloride complex was grinded with a jaw crusher to prepare a powder having an average particle size of 5 mm.

Preparation Example 2

An acylchloride complex was prepared in the same manner as in Preparation Example 1, except that 549.4 g (2.704 mol) of terephthaloyl chloride (TPC; melting point: 83° C.) and 120.6 g (0.594 mol) of isophthaloyl chloride (IPC; melting point: 44° C.) were added.

EXAMPLE: PREPARATION OF POLYAMIDE RESIN AND POLYAMIDE RESIN FILM

Example 1

(1) Polyamide Resin 262 g of N,N-dimethylacetamide (DMAc) was filled into a 500 mL 4-neck round flask (reactor) equipped with a stirrer, a nitrogen injection device, a dropping funnel and a temperature controller while slowly blowing nitrogen into the reactor. Then, the temperature of the reactor was adjusted to 0° C., and 14.153 g (0.0442 mol) of 2,2'-bis(trifluoromethyl)-4,4'-biphenyldiamine (TFDB) was added and dissolved.

8.972 g (0.0442 mol) of the acyl chloride complex powder obtained in Preparation Example 1 was added thereto and stirred, and subjected to amide formation reaction at 0° C. for 12 hours.

After completion of the reaction, N,N-dimethylacetamide (DMAc) was added to dilute the solution to a solid content of 5% or less, and the resultant was precipitated with 1 L of methanol. The precipitated solids were filtered and then dried at 100° C. under vacuum for 6 hours or more to prepare a solid-state polyamide resin.

It was confirmed through $^{13}$C-NMR shown in FIG. 1 that the polyamide resin obtained in (1) of Example 1, contained 85 mol % of the first repeating unit obtained by an amide reaction of terephthaloyl chloride (TPC) and 2,2'-bis(trifluoromethyl)-4,4'-biphenyldiamine (TFDB) and 15 mol % of the second repeating unit obtained by an amide reaction of isophthaloyl chloride (IPC) and 2,2'-bis(trifluoromethyl)-4,4'-biphenyldiamine (TFDB).

(2) Polyamide Resin Film

The polyamide resin obtained in (1) of Example 1, and Tinuvin 329 (UV blocking agent) 5 phr (5 parts by weight relative to 100 parts by weight of polyamide resin) were dissolved in N,N-dimethylacetamide to prepare about 10% (w/v) polymer solution.

The polymer solution was applied onto a polyimide substrate film (UPILEX-75s, UBE), and the thickness of the polymer solution was uniformly adjusted using a film applicator.

Then, after drying for 15 minutes at 80° C. Mathis oven, it was cured at 250° C. for 30 minutes while flowing nitrogen, and then peeled from the substrate film to obtain a polyamide resin film (thickness: 50 μm).

Example 2

(1) Polyamide Resin

A polyamide resin was prepared in the same manner as in (1) of Example 1, except that the acyl chloride complex powder obtained in Preparation Example 2 was used instead of the acyl chloride complex powder obtained in Preparation Example 1.

It was confirmed through $^{13}$C-NMR shown in FIG. 2 that the polyamide resin obtained in (1) of Example 2, contained 82 mol % of the first repeating unit obtained by an amide reaction of terephthaloyl chloride (TPC) and 2,2'-bis(trifluoromethyl)-4,4'-biphenyldiamine (TFDB), and 18 mol % of the second repeating unit obtained by an amide reaction of isophthaloyl chloride (IPC) and 2,2'-bis(trifluoromethyl)-4,4'-biphenyldiamine (TFDB).

(2) Polyamide Resin Film

A polyamide resin film (thickness: 50 μm) was prepared in the same manner as in (2) of Example 1, except that the polyamide resin obtained in (1) of Example 2 was used instead of the polyamide resin obtained in (1) of Example 1.

COMPARATIVE EXAMPLE: PREPARATION OF POLYAMIDE RESIN AND POLYAMIDE RESIN FILM

Comparative Example 1

A polyamide resin and a polyamide resin film (thickness: 49 μm) were prepared in the same manner as in Example 1, except that Tinuvin 329 was not added as the UV blocking agent.

REFERENCE EXAMPLE: PREPARATION OF POLYAMIDE RESIN

Reference Example 1

A polyamide resin was prepared in the same manner as in (1) of Example 1, except that instead of the acyl chloride complex powder obtained in Preparation Example 1, 7.358 g (0.0362 mol) of terephthaloyl chloride (TPC) and 1.615 g (0.0080 mol) of isophthaloyl chloride (IPC) were added simultaneously to perform an amide formation reaction.

Reference Example 2

A polyamide resin was prepared in the same manner as in (1) of Example 1, except that instead of the acyl chloride complex powder obtained in Preparation Example 1, 7.358 g (0.0362 mol) of terephthaloyl chloride (TPC) was first added, and then 1.615 g (0.0080 mol) of isophthaloyl chloride (TPC) was added sequentially at about 5 minute intervals to perform an amide formation reaction.

Reference Example 3

A polyamide resin was prepared in the same manner as in (1) of Example 1, except that instead of the acyl chloride complex powder obtained in Preparation Example 1, 1.615 g (0.0080 mol) of isophthaloyl chloride (IPC) was first added, and then 7.358 g (0.0362 mole) of terephthaloyl chloride (TPC) was added sequentially at about 5 minute intervals to perform an amide formation reaction.

Reference Example 4

262 g of N,N-dimethylacetamide (DMAc) was filled into a 500 mL 4-neck round flask (reactor) equipped with a stirrer, a nitrogen injection device, a dropping funnel and a temperature controller while slowly blowing nitrogen into the reactor. Then, the temperature of the reactor was adjusted to 0° C., and then 7.358 g (0.0362 mol) of terephthaloyl chloride (TPC) and 1.615 g (0.0080 mol) of isophthaloyl chloride (IPC) were added and dissolved.

14.153 g (0.0442 mol) of 2,2'-bis(trifluoromethyl)-4,4'-biphenyldiamine (TFDB) in powder form was added thereto and stirred, and subjected to amide formation reaction at 0° C. for 12 hours.

After completion of the reaction, N,N-dimethylacetamide (DMAc) was added to dilute the solution to a solid content of 5% or less, and the resultant was precipitated with 1 L of methanol. The precipitated solids were filtered and then dried at 100° C. under vacuum for 6 hours or more to prepare a solid-state polyamide resin.

Experimental Example 1

A specimen of 5 cm*5 cm size was prepared using the polyamide resin films obtained in Examples and Comparative Examples. The specimen was irradiated with an ultraviolet light having a light amount of 1.1 w/m$^2$ and a wavelength of 340 nm by a 40 W lamp using a QUV Accelerated Weathering Tester of Q-Lab Corporation at a temperature of 50° C. for a total of 10 days. The lightness index ($L_n$), color coordinates ($a_n$, $b_n$) and yellowness index ($YI_n$) on the n-th day (n is an integer of 1 to 10) of ultraviolet irradiation were measured every day using a Shimadzu UV-2600 UV-vis spectrometer.

Specifically, the lightness index (L) and the color coordinate (a, b) mean values in the coordinate axes representing the intrinsic colors, respectively. l has a value of 0 to 100, a value closer to 0 indicates black colors, and a value closer to 100 indicates white colors, a has positive (+) and negative (−) values with respect to 0 wherein the positive (+) means reddish colors, and the negative (−) means greenish. b has positive (+) and negative (−) values with respect to 0 wherein the positive (+) means yellowish colors, and the negative (−) means bluish colors.

The yellowness index (YI), the lightness index ($L_n$) and the color coordinate ($a_n$, $b_n$) were measured according to ASTM E313 using a Shimadzu UV-2600 UV-vis spectrometer.

Further, the color difference variation rate ($Eab_n$) on the n-th day (n is an integer of 1 to 10) of ultraviolet irradiation was calculated according to the following Mathematical Formula and shown in Tables 1 to 6 below.

$$Eab_n = \{(L_n - L_1)^2 + (a_n - a_{n-1})^2 + (b_n - b_{n-1})^2\}^{1/2}$$ [Mathematical Formula]

wherein, $L_{n-1}$ is a lightness index of the polyamide resin film on the (n−1)th day (n is an integer of 1 to 10) of ultraviolet irradiation, $a_{n-1}$ and $b_{n-1}$ are color coordinates of the polyamide resin film on the (n−1)th day (n is an integer of 1 to 10) of ultraviolet irradiation, $L_n$ is a lightness index of the polyamide resin film on the n-th day (n is an integer of 1 to 10) of ultraviolet irradiation, and $a_n$ and $b_n$ are color coordinates of the polyamide resin film on the n-th day (n is an integer of 1 to 10) of ultraviolet irradiation.

TABLE 1

Polyamide Resin Film of Example 1

| Day (n) | Lightness index ($L_n$) | Color coordinate ($a_n$) | Color coordinate ($b_n$) | Yellowness index ($YI_n$) | Color difference variation rate ($Eab_n$) |
|---|---|---|---|---|---|
| 0 | 95.51 | −0.53 | 1.69 | 3.08 | — |
| 1 | 95.74 | −0.65 | 2.15 | 3.86 | 0.52811 |
| 2 | 95.74 | −0.74 | 2.46 | 4.37 | 0.32027 |
| 3 | 95.78 | −0.84 | 2.73 | 4.80 | 0.29319 |
| 4 | 95.79 | −0.87 | 2.81 | 4.94 | 0.08559 |
| 5 | 95.79 | −0.90 | 2.90 | 5.08 | 0.09500 |
| 6 | 95.80 | −0.93 | 2.98 | 5.21 | 0.08602 |
| 7 | 95.80 | −0.96 | 3.06 | 5.35 | 0.08544 |
| 8 | 95.83 | −0.96 | 3.02 | 5.27 | 0.05000 |
| 9 | 95.83 | −0.99 | 3.11 | 5.41 | 0.09487 |
| 10 | 95.83 | −1.02 | 3.20 | 5.55 | 0.09487 |

TABLE 2

Polyamide Resin Film of Example 2

| Day (n) | Lightness index ($L_n$) | Color coordinate ($a_n$) | Color coordinate ($b_n$) | Yellowness index ($YI_n$) | Color difference variation rate ($Eab_n$) |
|---|---|---|---|---|---|
| 0 | 95.30 | −0.39 | 1.38 | 2.60 | — |
| 1 | 95.70 | −0.76 | 2.01 | 3.51 | 0.83295 |
| 2 | 95.77 | −0.45 | 2.23 | 4.16 | 0.38652 |
| 3 | 95.80 | −0.78 | 2.49 | 4.40 | 0.42379 |
| 4 | 95.93 | −0.88 | 2.87 | 5.03 | 0.41229 |

TABLE 2-continued

Polyamide Resin Film of Example 2

| Day (n) | Lightness index ($L_n$) | Color coordinate ($a_n$) | Color coordinate ($b_n$) | Yellowness index ($YI_n$) | Color difference variation rate ($Eab_n$) |
|---|---|---|---|---|---|
| 5 | 95.95 | −0.93 | 2.99 | 5.22 | 0.12627 |
| 6 | 95.86 | −0.76 | 2.99 | 5.35 | 0.18736 |
| 7 | 95.55 | −0.89 | 3.08 | 5.44 | 0.34459 |
| 8 | 95.87 | −0.93 | 3.15 | 5.52 | 0.33000 |
| 9 | 95.83 | −1.02 | 3.24 | 5.63 | 0.13342 |
| 10 | 95.85 | −1.11 | 3.35 | 5.75 | 0.14353 |

TABLE 3

Polyamide Resin Film of Comparative Example 1

| Day (n) | Lightness index ($L_n$) | Color coordinate ($a_n$) | Color coordinate ($b_n$) | Yellowness index ($YI_n$) | Color difference variation rate ($Eab_n$) |
|---|---|---|---|---|---|
| 0 | 95.06 | −0.24 | 1.47 | 2.89 | — |
| 1 | 95.77 | −1.57 | 4.22 | 7.04 | 3.13616 |
| 2 | 95.80 | −1.70 | 4.54 | 7.53 | 0.34670 |
| 3 | 95.82 | −1.82 | 4.85 | 8.02 | 0.33302 |
| 4 | 95.85 | −1.95 | 5.16 | 8.51 | 0.33749 |
| 5 | 95.79 | −2.00 | 5.40 | 9.90 | 0.25239 |
| 6 | 95.80 | −2.05 | 5.53 | 9.90 | 0.13964 |
| 7 | 95.80 | −2.10 | 5.66 | 9.91 | 0.13928 |
| 8 | 95.81 | −2.14 | 5.80 | 9.91 | 0.14595 |
| 9 | 95.81 | −2.19 | 5.94 | 9.92 | 0.14866 |
| 10 | 95.82 | −2.24 | 6.06 | 9.92 | 0.13038 |

As shown in Table 1, in the case of the polyamide resin film obtained in Example 1, it was confirmed that the color difference variation rate ($Eab_1$) measured at the $1^{st}$ day was as low as 0.52811, while the yellowness index (YI1) was measured to be as low as 3.86, thereby having excellent light resistance.

In addition, as shown in Table 2, in the case of the polyamide resin film obtained in Example 2, it was confirmed that the color difference variation rate ($Eab_1$) measured on the $1^{st}$ day was as low as 0.83295, while the yellowness index (YI1) was measured to be as low as 3.51, thereby having excellent light resistance.

On the other hand, as shown in Table 3, in the case of the polyamide resin film obtained in Comparative Example 1, it was confirmed that the color difference variation rate ($Eab_1$) measured on the $1^{st}$ day was 3.13616, which was significantly increased compared to Examples, and the yellowness index (YI1) was also measured to be as high as 7.04, thereby having poor light resistance compared to Examples.

Experimental Example 2

(1) Retardation (Rth) Value in Thickness Direction at Wavelength of 550 nm

The retardation (Rth) value in the thickness direction was determined by using the polymer film (length: 76 mm, width: 52 mm, and thickness: 13 μm) prepared in each of Examples and Comparative Examples as a measuring sample, using a measuring apparatus manufactured by AXOMETRICS, Inc. under the trade name of "AxoScan", inputting a value of a refractive index (the refractive index at a wavelength of 550 nm of the film obtained by the measurement of the refractive index described above) of each polymer film into the measuring apparatus, measuring the thickness-direction retardation value by using light at a wavelength of 550 nm under conditions of a temperature: 25° C. and a humidity: 40%; and then converting the measured value of the thickness-direction retardation value thus obtained (the value was measured according to the automatic measurement of the measuring apparatus) into a retardation value per 10 μm of the thickness of the film, and the results are shown in Table 4 below.

(2) Moisture Absorption Rate

The moisture absorption rate was calculated according to the following Mathematical Formula 2 and shown in Table 4 below.

Moisture Absorption Rate (%)=(W1−W2)*100/W2
    [Mathematical Formula 2]

in Mathematical Formula 2, W1 is a weight measured by impregnating the polyamide resin film in ultrapure water for 24 hours, and W2 is a weight measured by drying the polyamide resin film after at 150° C. for 30 minutes after the impregnation.

TABLE 4

| Category | Example 1 | Example 2 | Comparative Example 1 |
|---|---|---|---|
| Thickness-direction retardation (Rth, nm) value | −5853.056 | −5264.015 | −6883.246 |
| Moisture absorption rate (%) | 2.48 | 2.75 | 2.45 |

Referring to Table 4 above, it was confirmed that in the polyamide resin films of Examples satisfying the physical properties that a retardation (Rth) value in the thickness direction at a wavelength of 550 nm in an unstretched state was −5853.056 nm or more and −5264.015 or less and a moisture absorption rate according to Mathematical Formula 1 was 2.48% or more and 2.75% or less, the moisture penetration and the like can be prevented, and the mechanical strength can be improved depending on the orientation of the polymer in the film together with colorless and transparent optical properties. On the contrary, the polyamide resin films of Comparative Examples had a retardation (Rth) value in the thickness direction at a wavelength of 550 nm in the unstretched state of −6883.246 nm and a moisture absorption rate according to Mathematical Formula 1 of 2.45%, which was poor in comparison with Examples.

Experimental Example 3

The following characteristics were measured or evaluated for the polyamide resin films obtained in the above examples and comparative examples, and the results are shown in Table 5 below.

(1) Thickness: The thickness of the film was measured using a thickness measuring device.
(2) Haze: The haze value of the polyamide resin film was measured according to the ASTM D1003 test method using a COH-400 Spectrophotometer (NIPPON DENSHOKU INDUSTRIES).
(3) Bending Property: The folding endurance of the polyamide resin films was evaluated using an MIT type folding endurance tester. Specifically, a specimen (1 cm*7 cm) of the polyamide resin film was loaded into the folding endurance tester, and folded to an angle of 1350 at a rate of 175 rpm on the left and right sides of the specimen, with a radius of curvature of 0.8 mm and a load of 250 g, until the specimen was bended and fractured. The number of reciprocating bending cycles was measured as the folding endurance.

(4) Pencil Hardness: The pencil hardness of the polyamide resin films was measured according to the ASTM D3363 test method using a Pencil Hardness Tester. Specifically, varying hardness values of pencils were fixed to the tester and scratched on the polyamide resin film, and the degree of occurrence of a scratch on the polyamide resin film was observed with the naked eye or with a microscope. When more than 70% of the total number of scratches were not observed, a value corresponding to the hardness of the pencil was evaluated as the pencil hardness of the polyamide resin film.

The pencil hardness is increased in the order of B grade, F grade and H grade. Within the same grade, the higher the number, the higher the hardness. Within the grade, the higher the number, the higher the hardness.

TABLE 5

| Category | Example 1 | Example 2 | Comparative Example 1 |
|---|---|---|---|
| Thickness (μm) | 50 | 50 | 49 |
| Haze (%) | 0.76 | 0.45 | 0.97 |
| Bending property (Cycle) | 10225 | 13521 | 9785 |
| Pencil hardness | 4 H | 3 H | 4 H |

Looking at Table 5 above, it was confirmed that the polyamide resin film of Examples had a low haze value of 0.45% to 0.76% at a thickness of about 50 μm, thereby exhibiting excellent transparency. It was also confirmed that it had a high pencil hardness of 3H to 4H grade and a folding endurance that was broken at the number of reciprocating bending cycles from 10225 to 13521, thereby securing excellent mechanical properties (scratch resistance and folding endurance).

Experimental Example 4

The following characteristics were measured or evaluated for the polyamide resins obtained in the above examples and reference examples, and the films obtained therefrom, and the results are shown in Table 6 below.

(1) Thickness: The thickness of the film was measured using a thickness measuring device.

(2) Haze: The haze value of the polyamide resin film was measured according to the ASTM D1003 test method using a COH-400 Spectrophotometer (NIPPON DENSHOKU INDUSTRIES).

(3) Molecular weight and polydispersity index (PDI): The weight average molecular weight (Mw) and the number average molecular weight (Mn) of the polyamide resin were measured by gel permeation chromatography (GPC, manufactured by Waters), and the polydispersity index (PDI) was calculated by dividing the weight average molecular weight by the number average molecular weight. Specifically, the measurement was performed using a 600 mm long column connecting two Polymer Laboratories PLgel MIX-B Columns (300 mm in length), through Waters 2605 Refractive Index (RI) Detector, wherein the evaluation temperature was 50 to 75° C. (about 65° C.), DMF 100 wt % solvent was used, the flow rate was 1 mL/min, and the sample was prepared at a concentration of 1 mg/mL and supplied in an amount of 100 μL for 25 minutes. The molecular weights could be determined using calibration curves formed using polystyrene standards. As the molecular weight of polystyrene standard products, 7 types of 3940/9600/31420/113300/327300/1270000/4230000 were used.

(4) Bending Property: The folding endurance of the films obtained from the polyamide resin was evaluated using an MIT type folding endurance tester. Specifically, a specimen (1 cm*7 cm) of the films obtained from the polyamide resins was loaded into the folding endurance tester, and folded to an angle of 1350 at a rate of 175 rpm on the left and right sides of the specimen, with a radius of curvature of 0.8 mm and a load of 250 g, until the specimen was bended and fractured. The number of reciprocating bending cycles was measured as the folding endurance.

(5) Viscosity: Under a constant reflux system at 25±0.2° C., the viscosity of the solution containing polyamide resin (solvent: dimethylacetamide (DMAc), solid content: 10 wt %) was measured according to ASTM D 2196: test method of non-Newtonian materials by Brookfield DV-2T Rotational Viscometer. As Brookfield silicone standard oil, a number of standard solutions having a viscosity range of 5000 cps to 200000 cps was used. The measurement was performed with a spindle LV-4 (64), 0.3-100 RPM, and the unit was cps (mPa·s).

(6) Pencil Hardness: The pencil hardness of the films obtained from the polyamide resin was measured according to the ASTM D3363 test method using a Pencil Hardness Tester. Specifically, varying hardness values of pencils were fixed to the tester and scratched on the polyamide resin film, and the degree of occurrence of a scratch on the films obtained from the polyamide resins was observed with the naked eye or with a microscope. When more than 70% of the total number of scratches were not observed, a value corresponding to the hardness of the pencil was evaluated as the pencil hardness of the polyamide resin film.

The pencil hardness is increased in the order of B grade, F grade and H grade. Within the same grade, the higher the number, the higher the hardness. Within the grade, the higher the number, the higher the hardness.

TABLE 6

| Category | Example 1 | Example 2 | Reference Example 1 | Reference Example 2 | Reference Example 3 | Reference Example 4 |
|---|---|---|---|---|---|---|
| Thickness(μm) | 49 | 50 | 51 | 51 | 50 | 50 |
| Y.I. | 2.89 | 2.68 | 8.55 | 25.10 | 4.59 | 2.28 |
| T (%)@550 nm | 88.50 | 88.75 | 85.63 | 75.94 | 87.57 | 88.82 |

TABLE 6-continued

| Category | Example 1 | Example 2 | Reference Example 1 | Reference Example 2 | Reference Example 3 | Reference Example 4 |
|---|---|---|---|---|---|---|
| T (%)@388 nm | 71.0 | 75.3 | 51.01 | 31.62 | 65.04 | 74.24 |
| Haze(%) | 0.97 | 0.81 | 3.43 | 24.21 | 1.61 | 0.40 |
| Mw(g/mol) | 463000 | 512000 | 412000 | 350000 | 382000 | 321000 |
| Bending property(Cycle) | 9785 | 12022 | 5210 | 785 | 4513 | 6351 |
| PDI | 2.71 | 1.84 | 2.05 | 2.02 | 1.98 | 2.00 |
| Viscosity(cps) | 174000 | 110000 | 54000 | 24000 | 28000 | 18000 |
| Pencil hardness | 4H | 3H | 1H | F | 1H | 2H |

Looking at Table 6 above, the polyamide resin of Examples prepared using the acyl chloride composite powder according to Preparation Examples 1 to 2 had a high weight average molecular weight of 463000 g/mol to 512000 g/mol, and the relative viscosity was measured to be as high as 110000 cps to 174000 cps. Moreover, it was confirmed that the polymer resin film obtained from the polyamide resin of Examples had a low yellowness index of 2.68 to 2.89 and a low haze value of 0.81% to 0.97% at a thickness of about 50 μm, thereby exhibiting excellent transparency. It was also confirmed that it had a high pencil hardness of 3H to 4H grade and a folding endurance that was broken at the number of reciprocating bending cycles from 9785 to 12022, thereby securing excellent mechanical properties (scratch resistance and folding endurance).

On the other hand, in the case of the polyamide resins of Reference Examples 1 to 3 in which the acyl chloride complex powder according to Preparation Examples 1 to 2 was not used in the synthesis process of the polyamide resin, the molecular weight was 321,000 g/mol to 412,000 g/mol which was decreased compared to Examples. The viscosity was 18,000 cps to 54,000 cps which was decreased compared to Examples. In addition, it was confirmed that the haze value was 1.61% to 24.21% which was increased compared to Examples, showing that the transparency was poor.

This is because, in Reference Examples 1, 2, and 3, due to the difference in solubility and reactivity between the TPC powder and the IPC powder, the block due to TPC is excessively formed, thereby increasing the crystallinity of the polyamide resin.

Meanwhile, it was confirmed that the polyamide resin of Reference Example 4, in which acyl chloride was dissolved in an amide solvent and treated as a solution, had a very low molecular weight of 321,000 g/mol, showing that the viscosity was reduced to 18000 cps than Examples. This is presumably because in Reference Example 4, deterioration due to moisture and hybridization with amide solvents occurred during the dissolution of acyl chloride.

The invention claimed is:
1. A polyamide resin film in which a color difference variation rate (Eab$_1$) value on the 1st day (n=1) of ultraviolet irradiation according to the following Mathematical Formula 1 is 2.5 or less:

$$Eab_n = \{(L_n - L_{n-1})^2 + (a_n - a_{n-1})^2 + (b_n - b_{n-1})^2\}^{1/2}$$ [Mathematical Formula 1]

wherein,
$L_{n-1}$ is a lightness index of the polyamide resin film on the (n−1)th day of ultraviolet irradiation,
$a_{n-1}$ and $b_{n-1}$ are color coordinates of the polyamide resin film on the (n−1)th day of ultraviolet irradiation,
$L_n$ is a lightness index of the polyamide resin film on the n-th day of ultraviolet irradiation, and
$a_n$ and $b_n$ are color coordinates of the polyamide resin film on the n-th day of ultraviolet irradiation, wherein a haze measured according to ASTM D1003 for a specimen having a thickness of 45 μm or more and 55 μm or less is 1.5% or less, wherein the polyamide resin film includes a polyamide resin containing aromatic amide repeating units derived from a combination of an aromatic diacyl compound and an aromatic diamine compound; and an ultraviolet light stabilizer, wherein the ultraviolet light stabilizer includes one or more compounds selected from the group consisting of a triazine-based UV absorber, a triazole-based UV absorber, and a HALS-based UV absorber, wherein the polyamide resin includes a first polyamide segment containing a repeating unit represented by Chemical Formula 1, or a block comprised thereof:

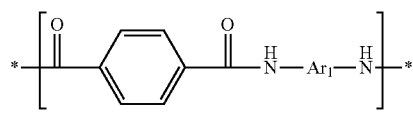

[Chemical Formula 1]

in the Chemical Formula 1, Ar$_1$ is a substituted or unsubstituted arylene group having 6 to 20 carbon atoms, or a substituted or unsubstituted heteroarylene group having 2 to 20 carbon atoms, wherein the polyamide resin further includes a second polyamide segment containing a repeating unit represented by Chemical Formula 2, or a block comprised thereof:

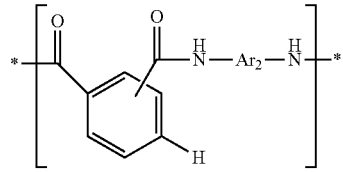

[Chemical Formula 2]

in the Chemical Formula 2,
Ar$_2$ is a substituted or unsubstituted arylene group having 6 to 20 carbon atoms, or a substituted or unsubstituted heteroarylene group having 2 to 20 carbon atoms, wherein the first polyamide segment and the second polyamide segment form a backbone chain including an alternating repeating unit represented by Chemical Formula 3:

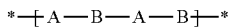

[Chemical Formula 3]

in the Chemical Formula 3,
A is the first polyamide segment, and
B is the second polyamide segment, and
wherein based on the total repeating units contained in the polyamide resin, a content of the repeating unit represented by Chemical Formula 1 is 80 mol % to 85 mol %, and a content of the repeating unit represented by Chemical Formula 2 is 15 mol % to 20 mol %.

2. The polyamide resin film of claim 1, wherein a lightness index $L_1$ of the polyamide resin film on the $1^{st}$ day of ultraviolet irradiation is at least 93.

3. The polyamide resin film of claim 1, wherein a color coordinate $a_1$ of the polyamide resin film on the $1^{st}$ day of ultraviolet irradiation is −1.5 or more, and $b_1$ is 4 or less.

4. The polyamide resin film of claim 1, wherein the color difference variation rate ($Eab_5$) value on the 5th day (n=5) of ultraviolet irradiation according to the Mathematical Formula 1 is 0.2 or less.

5. The polyamide resin film of claim 1, wherein the color difference variation rate ($Eab_1$) value on the $1^{st}$ day (n=1) of ultraviolet irradiation according to the Mathematical Formula 1 is 20 times or less the color difference variation rate ($Eab_{10}$) value on the 10th day (n=10) of ultraviolet irradiation according to the Mathematical Formula 1.

6. The polyamide resin film of claim 1, wherein after irradiating the polyamide resin film with ultraviolet rays for 1 day, a yellowness index measured according to ASTM E313 is 7 or less.

7. The polyamide resin film of claim 1, wherein a difference between a yellowness index measured according to ASTM E313 after irradiating the polyamide resin film with ultraviolet rays for 10 days, and a yellowness index measured according to ASTM E313 after irradiating the polyamide resin film with ultraviolet rays for 1 day, is 2.5 or less.

8. The polyamide resin film of claim 1, wherein the polyamide resin film has a retardation (Rth) value in the thickness direction at a wavelength of 550 nm of −8000 nm or more and −3000 nm or less, and a moisture absorption rate according to the following Mathematical Formula 2 is 0.5% or more and 7.0% or less:

Moisture Absorption Rate (%)=(W1−W2)*100/W2  [Mathematical Formula 2]

wherein in the Mathematical Formula 2,
W1 is a weight measured by impregnating the polyamide resin film in ultrapure water for 24 hours, and
W2 is a weight measured by drying the polyamide resin film at 150° C. for 30 minutes after the impregnation.

9. The polyamide resin film of claim 1, wherein the polyamide resin film has a retardation (Rth) value in the thickness direction at a wavelength of 550 nm of −6000 nm or more and −3000 nm or less.

10. The polyamide resin film of claim 1, wherein the first polyamide segment has a number average molecular weight of 100 g/mol or more and 5000 g/mol or less.

11. The polyamide resin film of claim 1, wherein the alternating repeating unit represented by Chemical Formula 3 is a repeating unit represented by Chemical Formula 4:

[Chemical Formula 4]

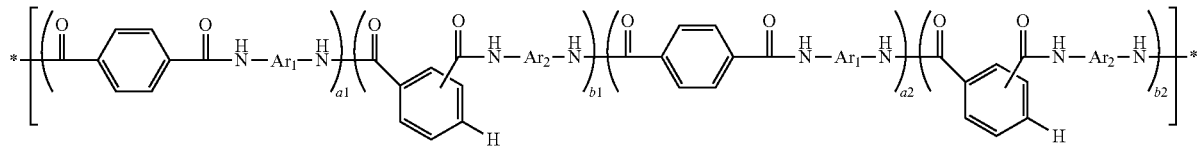

in the Chemical Formula 4,
$Ar_1$ and $Ar_2$ are each independently a substituted or unsubstituted arylene group having 6 to 20 carbon atoms, or a substituted or unsubstituted heteroarylene group having 2 to 20 carbon atoms,
a1 and a2 are each independently an integer of 1 to 10, and
b1 and b2 are each independently an integer of 1 to 5.

12. The polyamide resin film of claim 1, wherein the triazole-based UV absorber includes a compound represented by Chemical Formula 11:

[Chemical Formula 11]

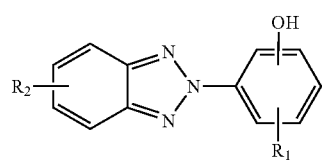

in the Chemical Formula 11,
$R_1$ and $R_2$ are each independently hydrogen or an alkyl group having 1 to 20 carbon atoms.

13. A resin laminate comprising:
a substrate including the polyamide resin film of claim 1; and
a hard coating layer formed on at least one side of the substrate.

* * * * *